(12) United States Patent
Taguchi et al.

(10) Patent No.: US 11,423,704 B2
(45) Date of Patent: Aug. 23, 2022

(54) APPARATUS FOR CONTROLLING MULTIPLE GATES THROUGH WHICH VEHICLES TRAVEL

(71) Applicant: SONY CORPORATION, Tokyo (JP)

(72) Inventors: Kazuaki Taguchi, Kanagawa (JP); Hiroaki Nishimura, West New York, NJ (US)

(73) Assignee: SONY CORPORATION, Tokyo (JP)

( * ) Notice: Subject to any disclaimer, the term of this patent is extended or adjusted under 35 U.S.C. 154(b) by 125 days.

(21) Appl. No.: 16/918,169

(22) Filed: Jul. 1, 2020

(65) Prior Publication Data

US 2022/0005288 A1    Jan. 6, 2022

(51) Int. Cl.
| | | |
|---|---|---|
| *G08B 21/00* | (2006.01) | |
| *G07B 15/04* | (2006.01) | |
| *G06T 7/73* | (2017.01) | |
| *G06V 20/52* | (2022.01) | |
| *G06V 20/56* | (2022.01) | |
| *G07B 15/06* | (2011.01) | |
| *G06V 20/62* | (2022.01) | |

(52) U.S. Cl.
CPC ............. *G07B 15/04* (2013.01); *G06T 7/73* (2017.01); *G06V 20/52* (2022.01); *G06V 20/588* (2022.01); *G07B 15/063* (2013.01); *G06V 20/625* (2022.01); *G06V 2201/08* (2022.01)

(58) Field of Classification Search
CPC .. G07B 15/04; G07B 15/063; G06K 9/00771; G06K 9/00798; G06K 2209/15; G06K 2209/23; G06T 7/73
USPC ........................................................ 340/937
See application file for complete search history.

(56) References Cited

U.S. PATENT DOCUMENTS

| | | | | |
|---|---|---|---|---|
| 5,034,739 A | * | 7/1991 | Gruhl ................. | G06Q 30/0284 340/932.2 |
| 6,075,333 A | * | 6/2000 | Huddle ..................... | E06B 9/68 318/266 |
| 2014/0207541 A1 | * | 7/2014 | Nerayoff ............. | G06K 9/6201 705/13 |
| 2017/0357881 A1 | * | 12/2017 | Hoshino .................. | G06K 9/80 |

FOREIGN PATENT DOCUMENTS

JP    2014-215786 A    11/2014

\* cited by examiner

*Primary Examiner* — Mark S Rushing
(74) *Attorney, Agent, or Firm* — Oblon, McClelland, Maier & Neustadt, L.L.P.

(57) ABSTRACT

An information processing apparatus includes a specifying unit configured to specify, on the basis of a position of an object in a captured image, from a plurality of control targets, the control target to be controlled in accordance with the object.

19 Claims, 21 Drawing Sheets

FIG. 5

| LANE NUMBER | REGION |
|---|---|
| 1 | X1-X2 |
| 2 | X3-X4 |
| 3 | X5-X6 |

LPR AREA = y1-y2
GATE OPENING LINE = y3
GATE CLOSING LINE = y4

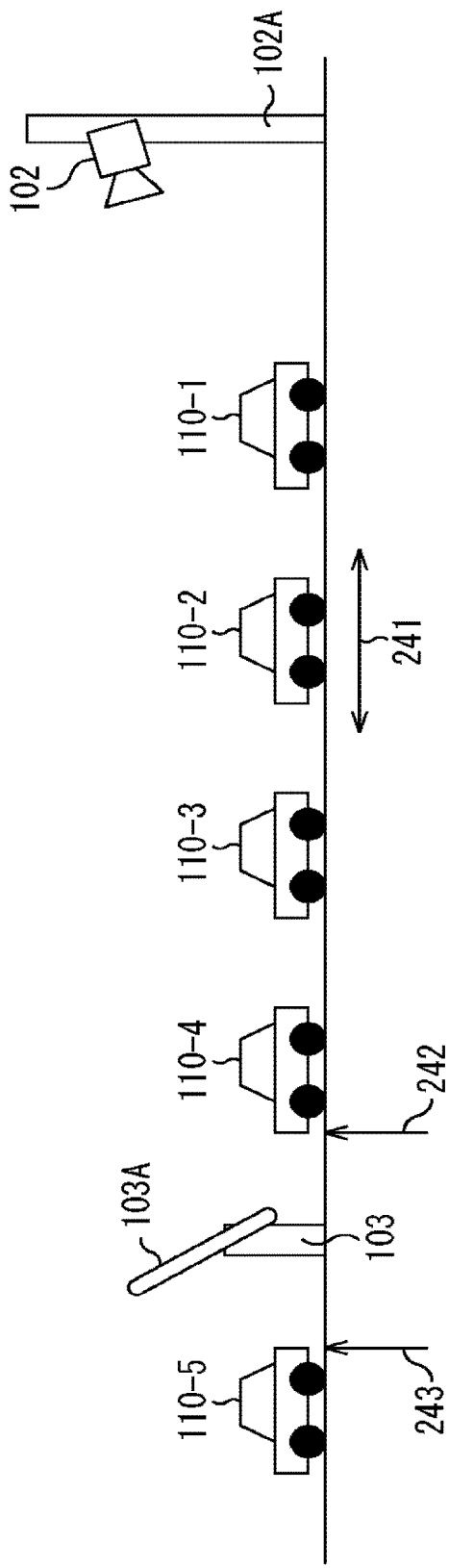

FIG. 8

| LP | VEHICLE TRACKER | OPEN OR CLOSED STATE | LANE NUMBER |
|---|---|---|---|
| 856-256 | x1, y1, cx1, cy1 | YES | 1 |
| 221-847 | x2, y2, cx2, cy2 | NO | 2 |
| 326-985 | x3, y3, cx3, cy3 | NO | 3 |

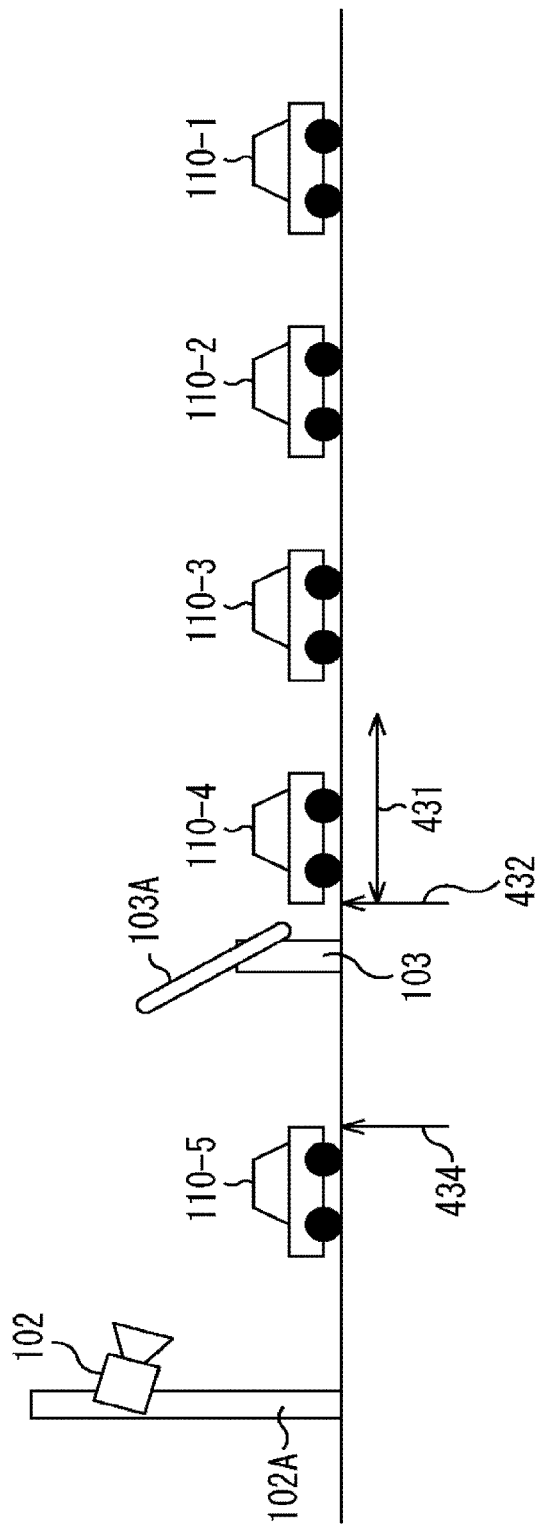

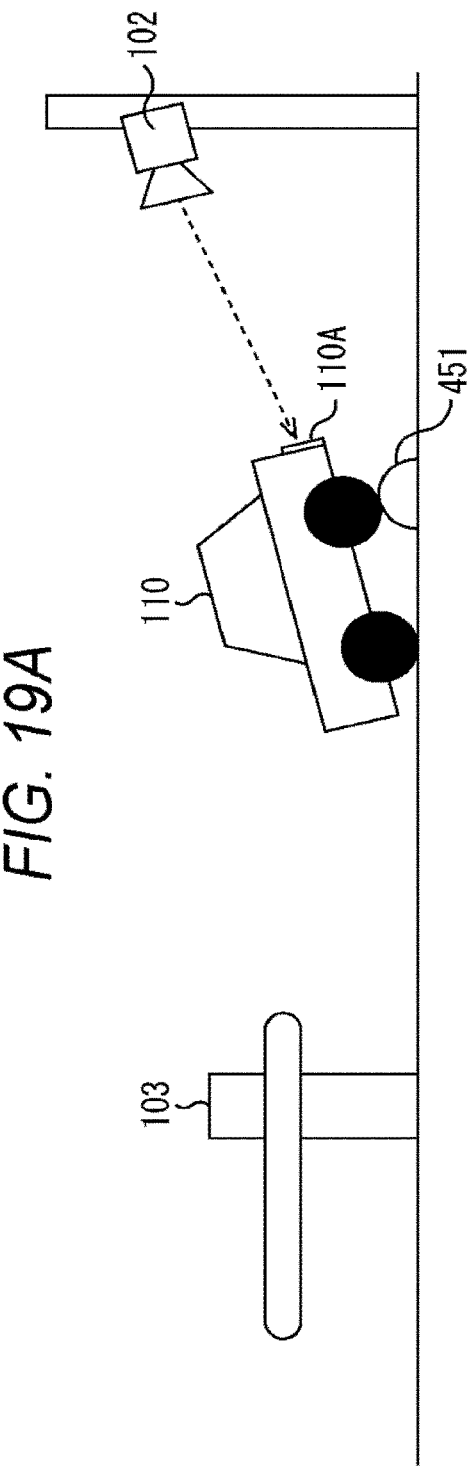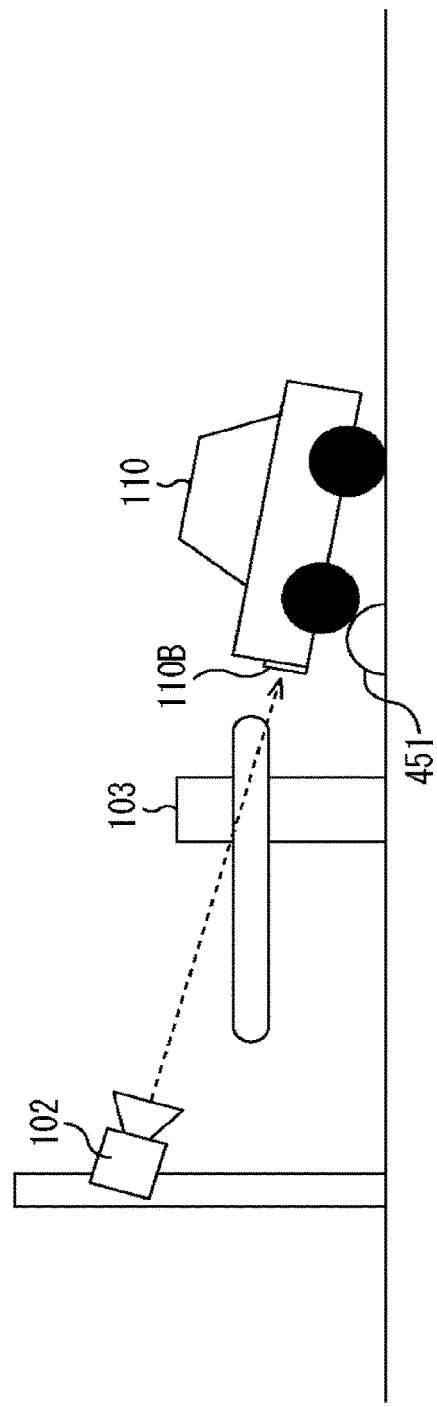

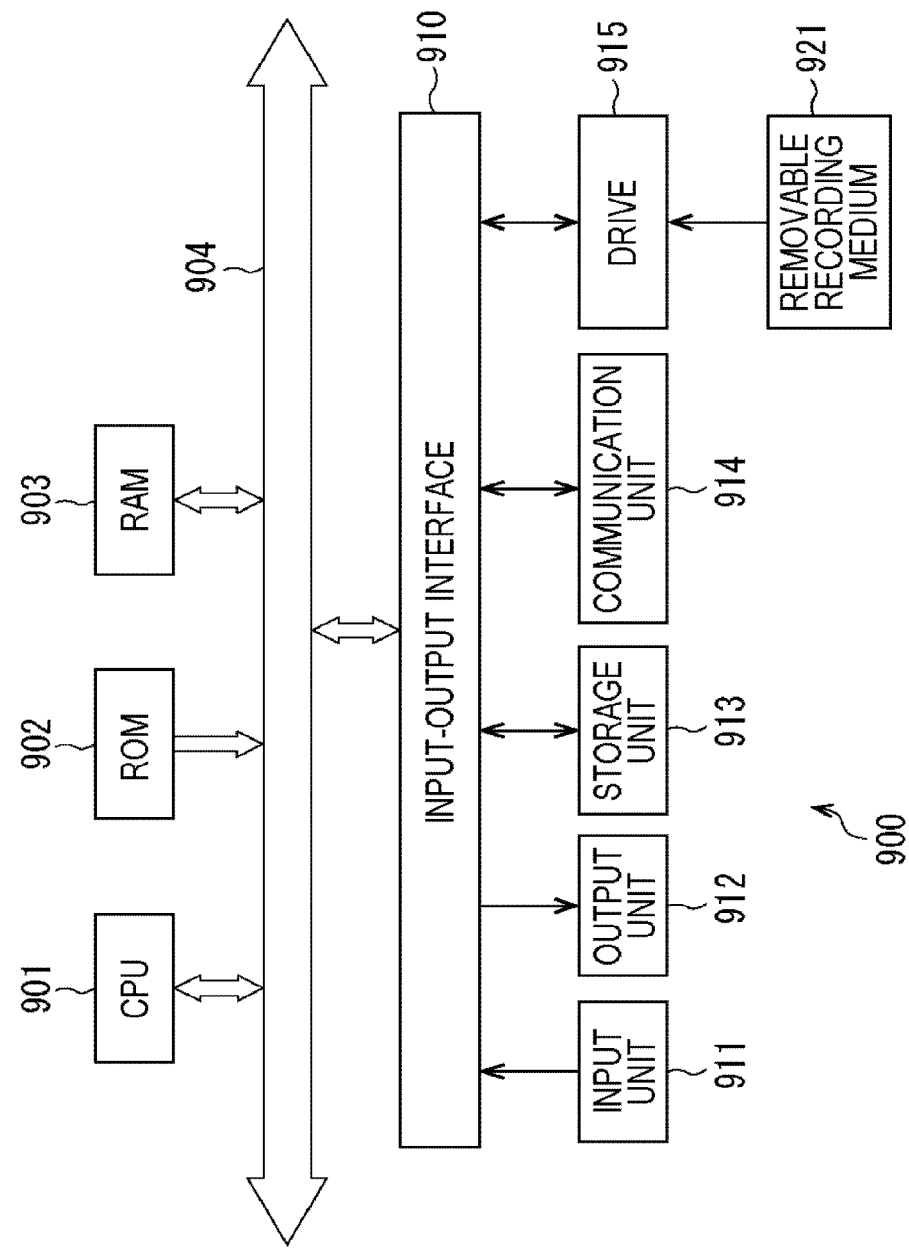

APPARATUS FOR CONTROLLING MULTIPLE GATES THROUGH WHICH VEHICLES TRAVEL

TECHNICAL FIELD

The present disclosure relates to an information processing apparatus and method, and a program, and particularly to an information processing apparatus and method, and a program that enables inhibition of an increase in cost.

BACKGROUND ART

In recent years, there has been considered a system that controls the passage of a vehicle on the basis of a captured image (for example, see PTL 1). PTL 1 discloses a system that captures, with a plurality of cameras, a position to be a point of guidance, and guides a vehicle on the basis of the captured images.

CITATION LIST

Patent Literature

[PTL 1]
JP 2014-215786 A

SUMMARY

Technical Problem

However, PTL 1 does not disclose control of a plurality of control targets, such as a case where passage control of a plurality of lanes is performed. For example, in a case where gates are provided one-to-one at a plurality of lanes and passage control of each lane is performed, in the related art, a sensor such as a loop coil or a photoelectric sensor is provided for each lane to detect a vehicle by the sensor, so that the opening and closing of the gate of the lane corresponding to the vehicle is controlled. Therefore, there has been a possibility of increasing the manufacturing and operation costs. The present disclosure has been made in view of such a situation, and enables inhibition of an increase in cost.

Solution to Problem

According to one aspect of the present technology, provided is an information processing apparatus including: a specifying unit configured to specify, on the basis of a position of an object in a captured image, from a plurality of control targets, the control target to be controlled in accordance with the object.

According to one aspect of the present technology, provided is an information processing method including: specifying, on the basis of a position of an object in a captured image, from a plurality of control targets, the control target to be controlled in accordance with the object.

According to one aspect of the present technology, provided is a program for causing a computer to function as: a specifying unit that specifies, on the basis of a position of an object in a captured image, from a plurality of control targets, the control target to be controlled in accordance with the object.

According to one aspect of the present technology, provided are an information processing apparatus and method, and a program, in which on the basis of a position of an object in a captured image, from a plurality of control targets, the control target to be controlled in accordance with the object is specified.

BRIEF DESCRIPTION OF DRAWINGS

FIG. 5 is a table indicating an example of area information.
FIG. 7 explanatorily illustrates an example of how passage control is performed.
FIG. 8 is table indicating an example of vehicle information.
FIG. 18 illustrates an example of a camera position.
FIGS. 19A and 19B illustrate an example of a bump.
FIG. 21 is a block diagram illustrating a main configuration example of a computer.

DESCRIPTION OF EMBODIMENTS

Hereinafter, modes for carrying out the present disclosure (hereinafter referred to as embodiments) will be described. Note that the description will be given in the following order.

1. First Embodiment (Passage Control System)
2. Supplementary Note

1. First Embodiment

<Passage Control>

PTL 1 discloses a system that captures, with a plurality of cameras, a position to be a point of guidance, and guides a vehicle on the basis of the captured images. However, PTL 1 does not disclose control of a plurality of control targets, such as a case where passage control of a plurality of lanes is performed.

For example, in a case where gates are provided one-to-one at a plurality of lanes and passage control of each lane is performed, in the related art, a sensor such as a loop coil or a photoelectric sensor is provided for each lane to detect a vehicle by the sensor, so that the opening and closing of the gate of the lane corresponding to the vehicle is controlled.

For example, in a case where a loop coil is used, work such as embedment of the loop coil in each lane is necessary. Thus, there has been a possibility of increasing the cost. Further, for example, in a case where a photoelectric sensor that uses infrared rays or the like to detect a vehicle on the basis of a change in light reception, the detection capability of the photoelectric sensor is low in resistance to environmental noise. Thus, there has been a possibility of reducing the detection capability due to, for example, rain, fog, or the like. As a result, for example, as compared with a technique in which a loop coil is used, there has been a possibility of increasing the occurrence probability of erroneous detection or detection failure. An occurrence of the erroneous detection, the detection failure, or the like creates a necessity of dealing with the occurrence. Thus, due to an increase in the occurrence probability of the erroneous detection or the detection failure, there has been a possibility of increasing the operation cost. Further, deviation of the optical axis results in a reduction in the detection performance. Thus, there also has been the possibility of increasing in the operation cost due to adjustment for the deviation.

Therefore, on the basis of the position of an object in a captured image, a control target to be controlled in accordance with the object is specified from a plurality of control targets. This arrangement enables control of the plurality of control targets by use of one captured image. Therefore, application of such a manner to passage control of a plurality or lanes such as described above enables inhibition of an increase in cost.

Figure 1:
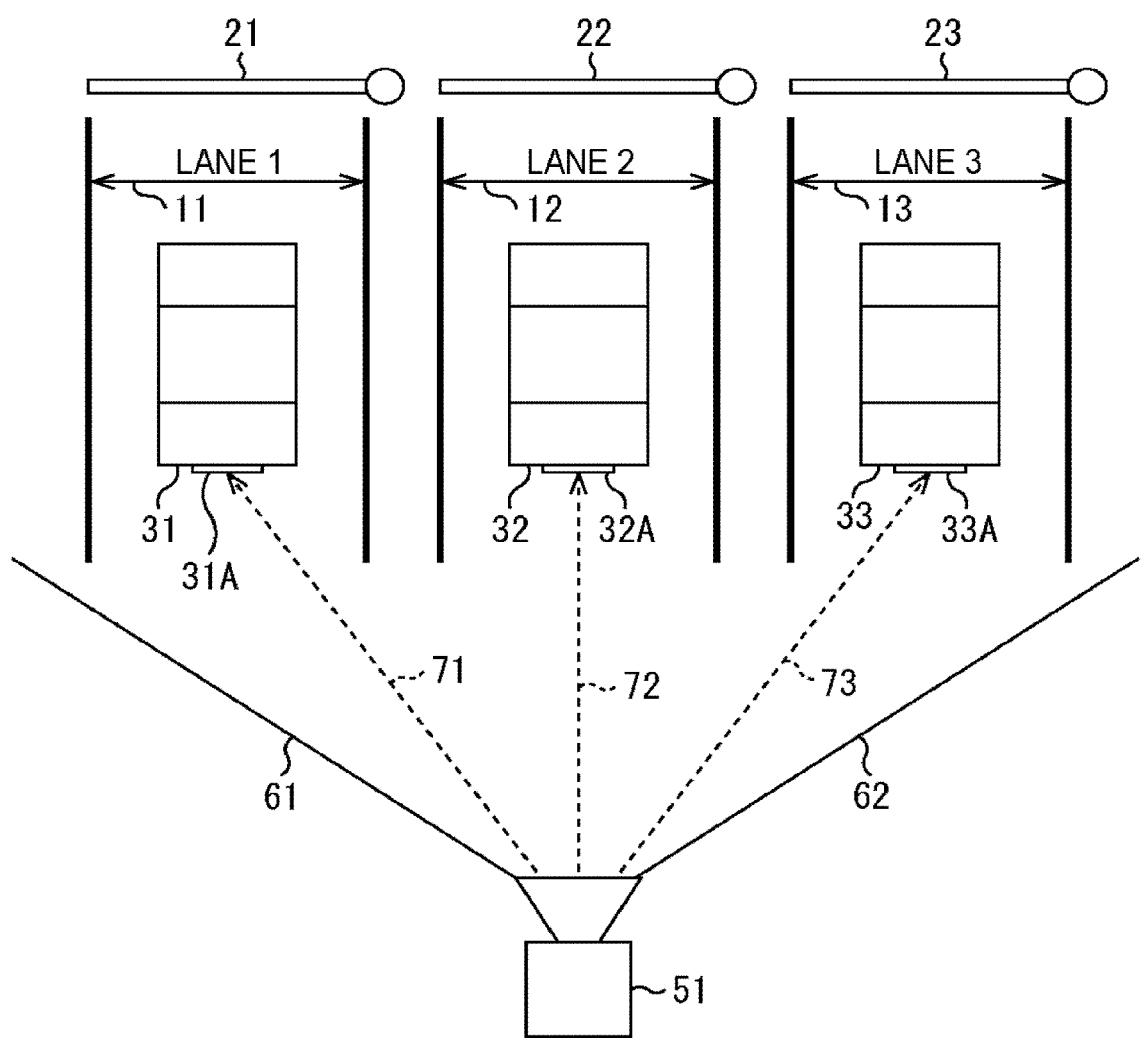
FIG. 1 illustrates an example of how passage control is performed.

FIG. 1 illustrates an example of how the passage control is performed. As illustrated in FIG. 1, provided are a lane 1, a lane 2, and a lane 3 indicated by a double-headed arrow 11, a double-headed arrow 12, and a double-headed arrow 13, respectively. The lane 1, the lane 2, and the lane 3 are provided with a gate 21, a gate 22, and a gate 23, respectively. The gate 21 opens and closes to control the passage of a vehicle in the lane 1. The gate 22 opens and closes to control the passage of a vehicle in the lane 2. The gate 23 opens and closes to control the passage of a vehicle in the lane 3. Note that, control of the passage of a vehicle means permission or prohibition (blocking) of the passage of the vehicle. For example, opening of the gate makes the vehicle pass, or closing of the gate makes the vehicle stop.

For example, a vehicle 31 travels in the lane 1. The gate 21 opens to permit or closes to prohibit (block) the passage of the vehicle 31. In addition, a vehicle 32 travels in the lane 2. The gate 22 opens to permit or closes to prohibit (block) the passage of the vehicle 32. A vehicle 33 travels in the lane 3. The gate 23 opens to permit or closes to prohibit (block) the passage of the vehicle 33.

In addition, a camera 51 is provided. The opening and closing of the gates 21 to 23 are controlled on the basis of a captured image acquired by the camera 51. That is, the respective passages in the lanes 1 to 3 are controlled on the basis of the captured image.

The camera 51 captures the range between a straight line 61 and a straight line 62. That is, the camera 51 keeps the lanes 1 to 3 within the angle of view of the camera 51, and captures the periphery of the gates 21 to 23. That is, the camera 51 can capture the vehicle 31 traveling in the lane 1, the vehicle 32 traveling in the lane 2, and the vehicle 33 traveling in the lane 3. In such an arrangement, the captured image includes a plurality of lanes (lanes 1 to 3). Thus, in order to control the respective passages in these lanes, it is necessary to specify which lane the vehicle is traveling in, on the basis of the captured image and control the gate provided at the lane.

Therefore, on the basis of the position of an object (in this case, the vehicle) in the captured image acquired by capturing of the camera 51, a control target to be controlled in accordance with the object is specified from a plurality of control targets (in this case, the gates). For example, the license plate of the vehicle traveling in the lane is detected in the captured image, and then the position of the vehicle (vehicle position) is detected from the position of the license plate. Then, on the basis of the vehicle position, in which lane the vehicle is traveling is specified.

For example, in the captured image, the license plate 31A of the vehicle 31 is detected as indicated by a dotted arrow 71. Then, the vehicle 31 is specified to be traveling in the lane 1, from the position of the license plate 31A. Similarly, in the captured image, the license plate 32A of the vehicle 32 is detected as indicated by a dotted arrow 72. Then, the vehicle 32 is specified to be traveling in the lane 2, from the position of the license plate 32A. Similarly, in the captured image, the license plate 33A of the vehicle 33 is detected as indicated by a dotted arrow 73. Then, the vehicle 33 is specified to be traveling in the lane 3, from the position of the license plate 33A.

Then, on the basis of the information, the gate 21 is specified as a gate to be controlled corresponding to the vehicle 31. Similarly, the gate 22 is specified as a gate to be controlled corresponding to the vehicle 32. Similarly, the gate 23 is specified as a gate to be controlled corresponding to the vehicle 33.

This arrangement enables control of the opening and closing of the gate 21 based on the captured image acquired by capturing of the camera 51, so that the passage of the vehicle 31 can be controlled. Further, control of the opening and closing of the gate 22 based on the captured image acquired by capturing of the camera 51 enables the passage of the vehicle 32 to be controlled. Furthermore, control of the opening and closing of the gate 23 based on the captured image acquired by capturing of the camera 51 enables the passage of the vehicle 33 to be controlled.

That is, the respective passages in the plurality of lanes can be controlled on the basis of the captured image acquired by one camera. The one camera is installed simply, so that the installation is easier as compared with a case where a loop coil or the like is used. In addition, the resistance to environmental noise is stronger and the adjustment is easier as compared with a case where a photoelectric sensor is used. Further, the installation cost is more inhibited and the maintenance is easier as compared with a case where a camera is installed for each lane. That is, an increase in cost can be inhibited.

<Vehicle Passage Control System>

Figure 2:
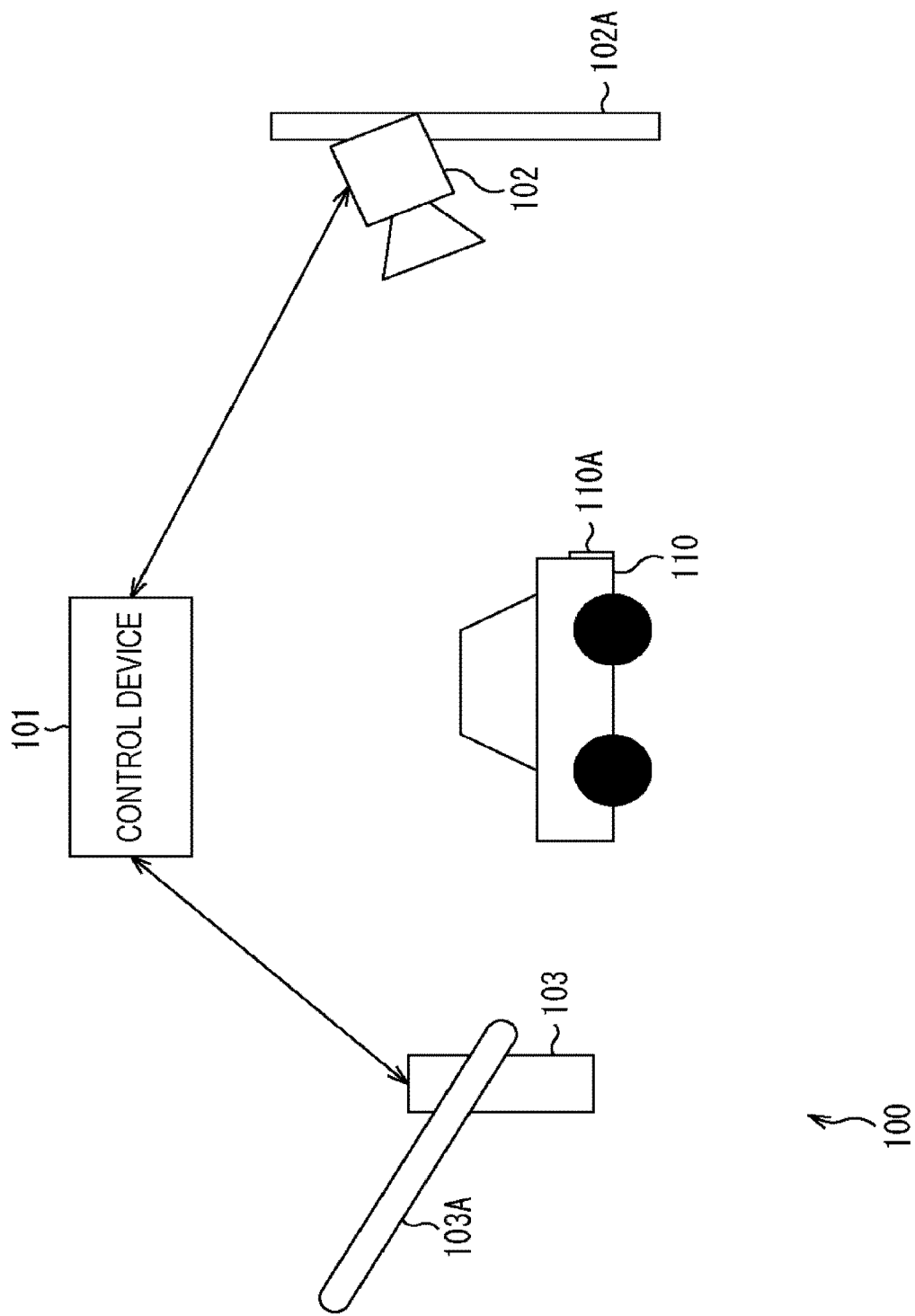
FIG. 2 illustrates a main configuration example of a passage control system.

FIG. 2 illustrates a main configuration example of a vehicle passage control system that is an aspect of an information processing system to which the present technology is applied. A vehicle passage control system 100 illustrated in FIG. 2 performs passage control such as described with reference to FIG. 1. That is, the vehicle passage control system 100 uses a captured image to control the passage of a vehicle 110 in a plurality of lanes.

As illustrated in FIG. 2, the vehicle passage control system 100 includes a control device 101, a camera 102, and a gate device 103. The control device 101, the camera 102, and the gate device 103 are connected by wire communication or wireless communication so as to be mutually communicable.

The control device 101 controls the camera 102 and the gate device 103. For example, the control device 101 controls the camera 102 such that the camera 102 captures the vicinity of the gate device 103. Then, the control device 101 acquires the captured image. The control device 101 detects the vehicle 110 in the captured image. Note that the vehicle 110 is detected by detecting the license plate 110A of the vehicle 110. The control device 101 specifies the gate device 103 to be controlled corresponding to the vehicle 110, on the basis of the position of the vehicle 110. Then, the control device 101 controls the opening and closing of the gate 103A of the specified gate device 103, in accordance with the position and movement of the vehicle 110. The control device 101 manages the position and movement of the vehicle 110 by managing the vehicle information of the detected vehicle 110.

The camera 102 captures the periphery of the gate device 103 under the control by the control device 101, and then generates a captured image. The camera 102 may be installed, for example, on a pole 102A or the like, and may perform image capturing from a position higher than the position of the vehicle 110. This arrangement enables, for example, inhibition of difficulty in detection of the license plate 110A due to blockage of a vehicle 110 by another vehicle 110 in a case where a plurality of vehicles 110 is in a row. The camera 102 supplies the captured image to the control device 101. The gate device 103 opens and closes the gate 103A under the control by the control device 101. The gate device 103 opens and closes the gate to control the passage of the vehicle 110.

Note that in the present specification, a vehicle is any movable object such as an automobile, a bus, a truck, a motorbike, a motorcycle, or a bicycle for transporting a person and an article. Further, instead of the vehicle, for example, a ship, an aircraft, an electric railcar (including a train and the like), and the like may be targeted.

In addition, in the present specification, vehicle information is information regarding a vehicle, and includes at least a vehicle registration number. A vehicle registration number indicates an identification number or the like shown on the license plate of the vehicle. A license plate for showing an identification number or the like for managing a vehicle registered in a country, a local government, or the like. The license plate includes, for example, in Japan, an automobile registration number mark for displaying an automobile registration number, a vehicle number mark and a sign for displaying a vehicle number, and the like. Further, the license plate includes a license plate in the United States and the like. That is, the vehicle registration number includes the above automobile registration number, vehicle number, sign, and the like.

Note that practically, not only numerals but also characters and symbols may be shown on the license plate. In the following, unless otherwise mentioned, numerals, characters, symbols, and the like shown on the license plate will be described as "characters" without distinction among the numerals, characters, symbols, and the like. Further, the above vehicle registration number (e.g., automobile registration number, vehicle number, and sign) may include not only numerals but also characters, symbols, and the like.

Furthermore, the vehicle information may include, for example, information of, for example, a vehicle name, a vehicle type, a model, and a vehicle color, and may include information regarding an external appearance characteristic such as a scratch.

Note that FIG. 2 illustrates one control device 101, one camera 102, and one gate device 103. However, a plurality of gate devices 103 is provided for one camera 102. For example, the camera 102 keeps a plurality of lanes within the angle of view of the camera 102, and the gate devices 103 are provided one-to-one at the lanes.

Needless to say, the number of cameras 102 to be controlled by the control device 101 may be selected freely, and a single camera 102 or a plurality of cameras 102 may be controlled.

<Control Device>

Figure 3:
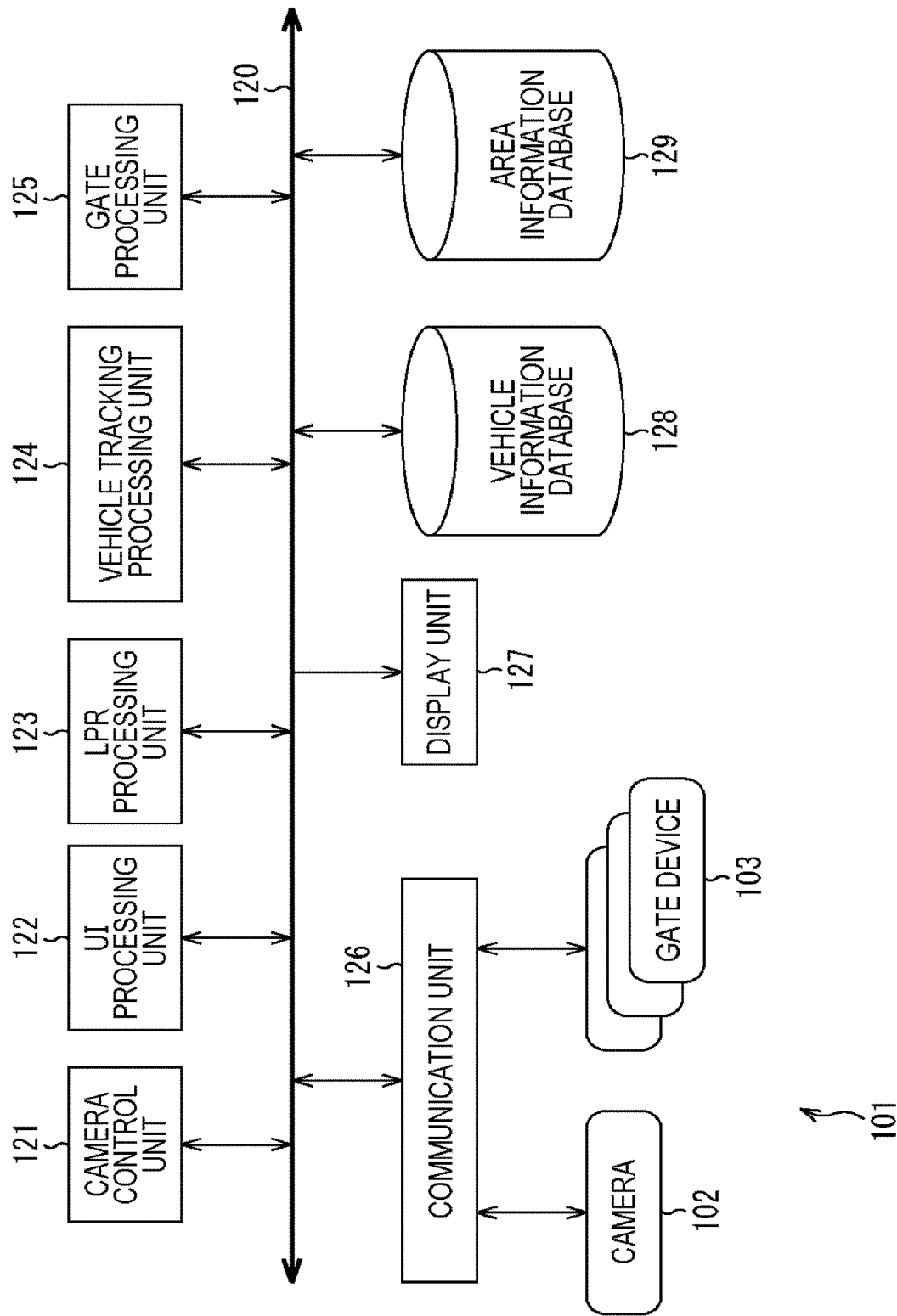
FIG. 3 is a block diagram illustrating a main configuration example of a control device.

FIG. 3 is a block diagram illustrating a main configuration example of the control device 101. Note that FIG. 3 mainly illustrates, for example, a processing unit and a data flow, and thus those illustrated in FIG. 3 are not necessarily all that are present. That is, in the control device 101, a processing unit not illustrated as a block in FIG. 3 may be present, and processing or a data flow not indicated as an arrow or the like in FIG. 3 may be present.

As illustrated in FIG. 3, the control device 101 includes: a camera control unit 121; a user inter face (UI) processing unit 122; a license plate recognition (LPR) processing unit 123; a vehicle tracking processing unit 124; a gate processing unit 125; a communication unit 126; a display unit 127; a vehicle information database 128; and an area information database 129. These processing units are mutually connected via a bus 120. That is, information is exchanged among these processing units via this bus 120.

The camera control unit 121 performs processing relating to control of the camera 102. For example, the camera control unit 121 controls the camera 102 via the communication unit 126 such that the camera 102 performs image capturing and supplies the captured image acquired by the capturing of the camera 102. Further, the camera control unit 121 may be capable of controlling the focal length, aperture, and the like of the camera 102. Furthermore, the camera control unit 121 may be capable of controlling the pan, tilt, zoom in, zoom out, and the like of the camera 102.

Figure 4:
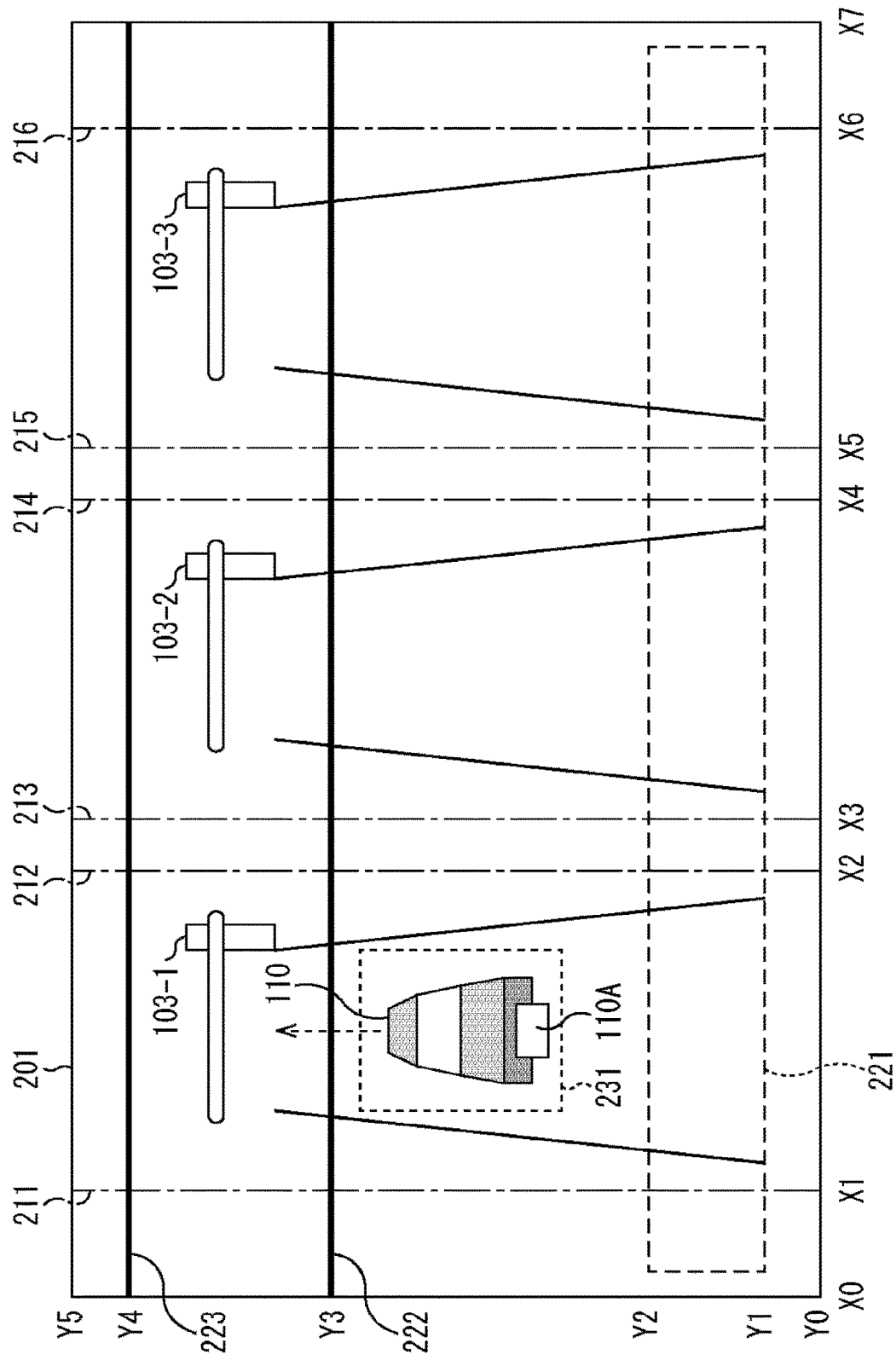
FIG. 4 illustrates an example of a captured image.

The UI processing unit 122 performs processing relating to a user interface. For example, the UI processing unit 122 acquires the captured image supplied from the camera 102, via the communication unit 126. Then, the UI processing unit 122 generates a superimposition image to be superimposed on the captured image for display. The content of this superimposition image may be selected freely. For example, the UI processing unit 122 generates an image indicating a position or a partial region in the captured image, as a superimposition image. An example of the captured image is illustrated in FIG. 4. In the captured image 201 in FIG. 4, three lanes are disposed horizontally and mutually parallel in the figure. The three lanes extend vertically in the figure. The vehicle 110 that is an object as a monitoring target travels forward the lane from the lower side to the upper side in the figure. The gate devices 103 (gate devices 103-1 to 103-3) that are control targets are provided one-to-one at the lanes, and the gate 103-1 opens and closes to control the passage of the vehicle 110. Further, it is assumed that the captured image 201 has the X coordinates of X0 to X7 and the Y coordinates of Y0 to Y5.

For the captured image 201 having such a composition, a one-dot chain line 211, a one-dot chain line 212, a one-dot chain line 213, a one-dot chain line 214, a one-dot chain line 215, and a one-dot chain line 216, are superimposed on X1, X2, X3, X4, X5, and X6, respectively. Further, a dotted-line rectangular frame (Y1 to Y2) indicating an LPR area 221 is superimposed on the lower side in the figure. Furthermore, a gate opening line 222 (Y3) and a gate closing line 223 (Y4) are superimposed on the upper side in the figure.

Referring back to FIG. 3, the UI processing unit 122 generates such a superimposition image, for example. Further, the UI processing unit 122 generates a composite image including the generated superimposition image on the captured image. Then, the UI processing unit 122 supplies the composite image to the display unit 127, and causes the display unit 127 to display the composite image.

The LPR processing unit 123 performs processing relating to license plate recognition. For example, the LPR processing unit 123 acquires the captured image supplied from the camera 102 via the communication unit 126. Further, the LPR processing unit 123 associates regions that are mutually different, one-to-one with the lanes (gate devices 103) in the captured image. For example, the LPR processing unit 123 associates the region between the one-dot chain line 211 and the one-dot chain line 212 (the region of X1 to X2) in the captured image 201 with the leftmost lane in the figure, that is, the gate device 103-1 (the lane at which the gate device 103-1 is disposed). Similarly, the LPR processing unit 123 associates the region between the one-dot chain line 213 and the one-dot chain line 214 (the region of X3 to X4) in the captured image 201 with the center lane in the figure, that is, the gate device 103-2 (the lane at which gate device 103-2 is disposed). Similarly, the LPR processing unit 123 associates the region between the one-dot chain line 215 and the one-dot chain line 216 (the region of X5 to X6) in the captured image 201 with the rightmost lane in the figure, that is, the gate device 103-3 (the lane at which the gate device 103-3 is disposed).

Further, the LPR processing unit 123 sets the LPR area 221 (Y1 to Y2). Furthermore, the LPR processing unit 123 sets the gate opening line 222 (Y3) and the gate closing line 223 (Y4). The UI processing unit 122 creates images of these settings to visualize.

As described above, the LPR processing unit 123 sets the regions that are mutually different, one-to-one to the plurality of gate devices 103 that are the control targets. Then, the LPR processing unit 123 supplies the information (area information) to the area information database 129, and causes the area information database 129 to register (i.e., to store) the information. An example of this area information is indicated in FIG. 5. As indicated in FIG. 5, the area information includes identification information of a lane (lane number) and the coordinate range of a region corresponding to the lane. Therefore, reference to this area information enables easy grasp that which region corresponds to which lane. Note that the area information may include other piece of information of, for example, the LPR area 221, the gate opening line 222, and the gate closing line 223. Note that these regions and positions may each have a fixed value or a variable value. That is, the regions one-to-one corresponding to the lanes (e.g., the positions of the one-dot chain lines 211 to 216), the LPR area 221, the gate opening line 222, the gate closing line 223, and the like, may be set one-to-one at positions defined in advance in the captured image 201. Alternatively, the LPR processing unit 123 may set these regions and positions on the basis of the composition of the captured image 201, such as the disposition of the lanes. For example, in a case where the camera 102 can pan and tilt, and zoom in and zoom out, the composition of the captured image 201 (the disposition of the lanes and the like in the captured image 201) can change. In accordance with such a change in composition, the LPR processing unit 123 may set a region corresponding to each lane (e.g., the positions of the one-dot chain lines 211 to 216), the LPR area 221, the gate opening line 222, the gate closing line 223, and the like.

Figure 6C:
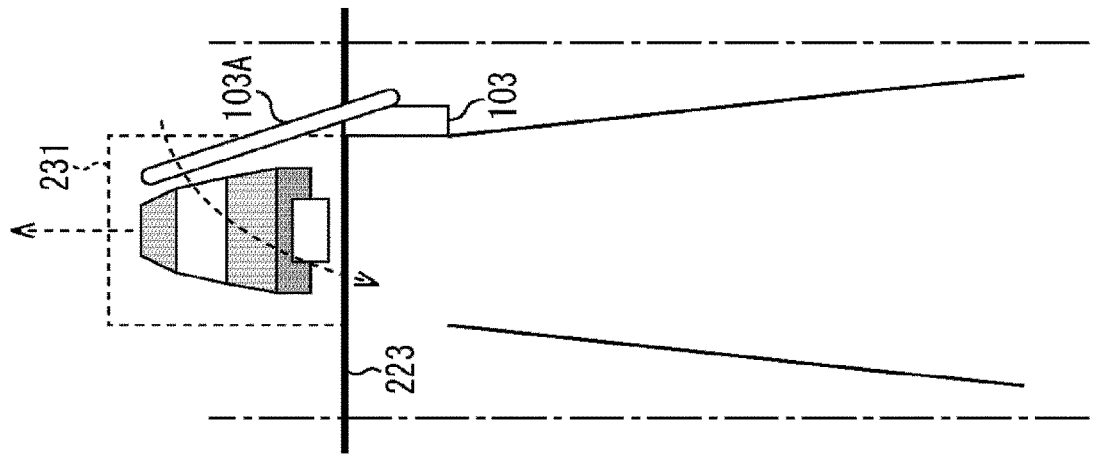
FIGS. 6A to 6C explanatorily illustrate an example of how gate control is performed.

Referring back to FIG. 3 again, the LPR processing unit 123 detects the license plate 110A in the captured image 201. At that time, the LPR processing unit 123 detects the license plate 110A in the LPR area 221, as illustrated in FIG. 6A. Setting the partial region for detecting the object that is the monitoring target in such a manner enables reduction of the range in which the object is detected and inhibition of load on the processing.

After detecting the license plate 110A, the LPR processing unit 123 detects the vehicle 110 on which the license plate 110A is mounted, on the basis of the position of the license plate 110A. After detecting the vehicle 110, the LPR processing unit 123 sets a vehicle tracker 231 that is a rectangular region including the vehicle 110. Note that the shape and the size of the vehicle tracker 231 may each have a fixed value, or may be set in accordance with the shape and the size of the vehicle 110 (i.e., may be variable).

In addition, the LPR processing unit 123 obtains the position of the detected vehicle 110, and specifies the lane in which the vehicle 110 is traveling. Further, the LPR processing unit 123 analyzes the vehicle registration number shown on the license plate 110A. Furthermore, the LPR processing unit 123 specifies the state of the gate 103A of the gate device 103 that is the control target.

The LPR processing unit 123 uses the analyzed vehicle registration number as identification information of the vehicle 110, and generates vehicle information that mutually associates the information of the vehicle registration number, the information of the position of the vehicle 110 (e.g., the position of the vehicle tracker 231), the information of the lane in which the vehicle 110 is located (i.e., the gate device 103 to be controlled in accordance with (the position and movement of) the vehicle 110), the information of the state of the control target (i.e., the open or closed state of the gate 103A), and the like. The LPR processing unit 123 supplies this vehicle information to the vehicle information database 128, and causes the vehicle information database 128 to register (i.e., to store) this vehicle information.

The vehicle tracking processing unit 124 performs processing rerating to tracking of the vehicle 110. For example, the vehicle tracking processing unit 124 obtains the latest position of the vehicle tracker 231 every predetermined period (e.g., every frame), and updates the position of the vehicle 110 (e.g., the position of the vehicle tracker 231) included in the vehicle information. The gate processing unit 125 performs processing relating to control of the gate device 103. For example, the gate processing unit 125 controls the gate device 103 via the communication unit 126, and controls the opening and closing of the gate 103A. At that time, the gate processing unit 125 controls the specified control target, on the basis of the vehicle position in the vehicle information. For example, the gate processing unit 125 may use a preset position or region such as the gate opening line 222 or the gate closing line 223 to control the gate device 103.

Figure 6B:
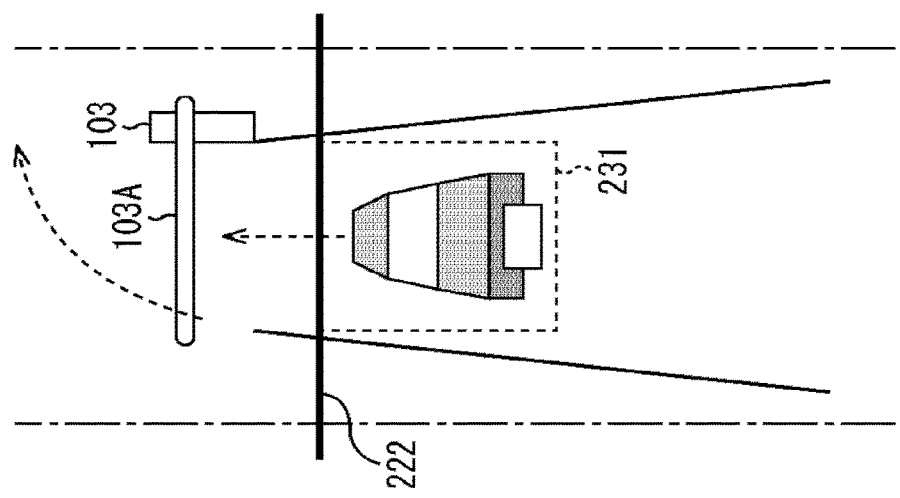
Figure 6A:
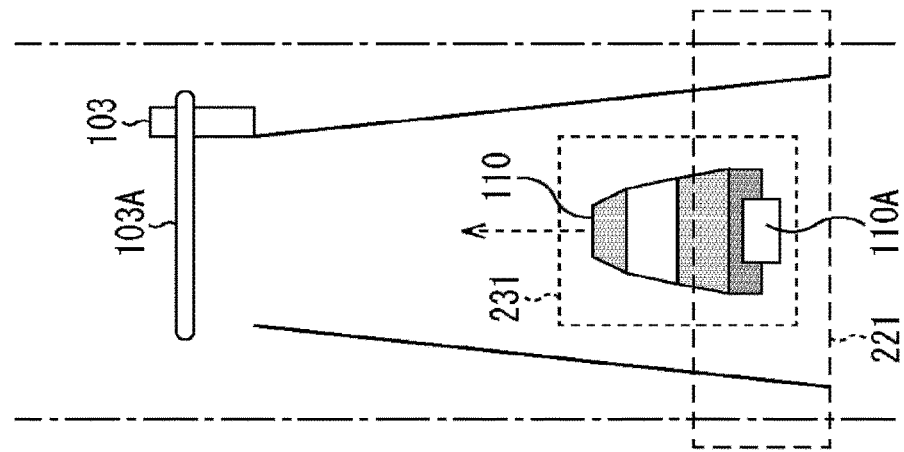

For example, as illustrated in FIG. 6B, after the front end of the vehicle tracker 231 (vehicle 110) crosses the gate opening line 222, the gate processing unit 125 controls the gate device 103 such that the gate 103A opens. In addition, for example, as illustrated in FIG. 6C, after the rear end of the vehicle tracker 231 (vehicle 110) crosses the gate closing line 223, the gate processing unit 125 controls the gate device 103 such that the gate 103A closes.

FIG. 7 illustrates such a lane as viewed transversely. In order to keep the plurality of lanes within the angle of view as in the example of FIG. 4, the camera 102 is installed at a position away from the gate device 103 to some extent.

Thus, for example, as illustrated in FIG. 7, a plurality of vehicles 110 may be located between the camera 102 and the gate device 103. As illustrated in FIG. 7, when the plurality of vehicles is in a row, there is a possibility that the rear vehicle may hide the license plate of the front vehicle. Therefore, the LPR area 221 is necessary to be set closer to the camera 102 than the gate device 103 is, as indicated by a double-headed arrow 241 in FIG. 7.

On the other hand, it is desirable that the gate opening line 222 is set, as indicated by an arrow 242, at a position closer to the gate device 103 than the camera 102 is, the position being located behind the gate device 103 as viewed from the camera 102.

Further, it is desirable that the gate closing line 223 is set ahead of the gate device 103 as viewed from the camera 102, as indicated by an arrow 243.

As described above, it may be desirable to control the gate device 103 (cause the gate 103A to open and close) when the vehicle 110 is located at a place different from the LPR area 221. Therefore, as the gate opening line 222 and the gate closing line 223 described above, explicitly setting of the position of the vehicle 110 at which the gate device 103 is to be controlled enables the gate processing unit 125 to more easily control the opening and closing of the gate 103A at appropriate timing.

Note that the gate processing unit 125 may control the opening and closing of the gate 103A on the basis of not only the position of the vehicle 110 but also the qualification of the vehicle 110. For example, the gate processing unit 125 may determines, on the basis of the vehicle registration number analyzed by the LPR processing unit 123, whether or not the vehicle 110 is qualified to pass. Then, the gate processing unit 125 may cause the gate 103A to open only in a case where the vehicle 110 has the qualification. This arrangement enables the gate processing unit 125 to control a process target corresponding to a specific object such as a vehicle registered in advance, for example.

The communication unit 126 performs processing relating to communication with other devices. For example, the communication unit 126 communicates with the camera 102 and each gate device 103. For example, the communication unit 126 can supply information (e.g., control information and the like) supplied from the camera control unit 121, the UI processing unit 122, the LPR processing unit 123, the vehicle tracking processing unit 124, or the gate processing unit 125, to the camera 102 and the gate device 103. Further, for example, the communication unit 126 can supply information (e.g., captured image and the like) supplied from the camera 102 or the gate device 103 to a necessary processing unit of the camera control unit 121, the UI processing unit 122, the LPR processing unit 123, the vehicle tracking processing unit 124, and the gate processing unit 125. Note that the communication method to be performed by the communication unit 126 may be selected freely. Wired communication may be performed, or wireless communication may be performed.

The display unit 127 includes, for example, a monitor such as a liquid crystal display (LCD) or an organic electro luminescence display (OELD), and displays a captured image supplied from another processing unit, the composite image generated by the UI processing unit 122, or the like. For example, the display unit 127 displays an image such as illustrated in FIG. 4.

The vehicle information database 128 includes a storage medium, and stores and manages the vehicle information supplied from the LPR processing unit 123. An example of the vehicle information is indicated in FIG. 8. As indicated in FIG. 8, in the vehicle information, mutually associated are pieces of information such as the vehicle registration number of a license plate (LP) (identification information of a vehicle), the position information (x, y) and size information (cx, cy) of a vehicle tracker, the open or closed state of a control target, and the lane number (identification information) of a lane in which the vehicle is located.

The gate processing unit 125 specifies the control target corresponding to the vehicle 110 on the basis of this vehicle information. Therefore, a plurality of control targets can be controlled more easily on the basis of the object. As a result, an increase in cost can be inhibited.

The area information database 129 includes a storage medium, and stores and manages the area information (FIG. 5) supplied from the LPR processing unit 123.

<Camera>

Figure 9:
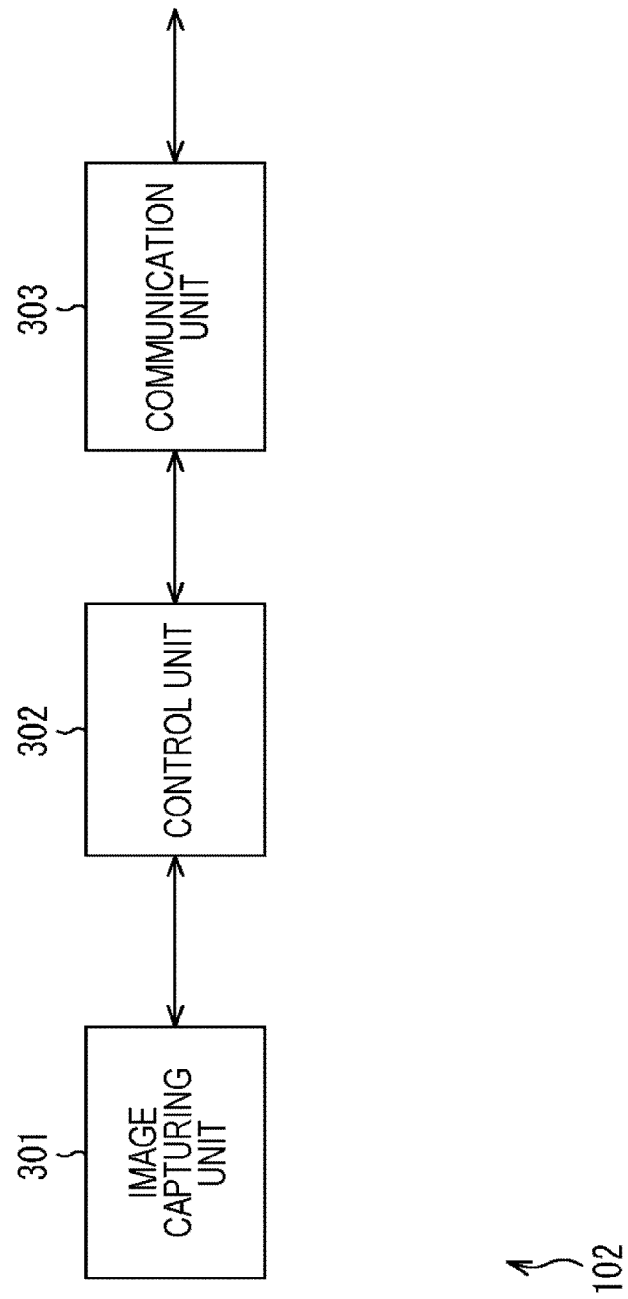
FIG. 9 is a block diagram illustrating a main configuration example of a camera.

FIG. 9 is a block diagram illustrating a main configuration example of the camera 102. Note that FIG. 9 mainly illustrates, for example, a processing unit and a data flow, and thus those illustrated in FIG. 9 are not necessarily all that are present. That is, in the camera 102, a processing unit not illustrated as a block in FIG. 9 may be present, and processing or a data flow not indicated as an arrow or the like in FIG. 9 may be present.

As illustrated in FIG. 9, the camera 102 includes an image capturing unit 301, a control unit 302, and a communication unit 303. The image capturing unit 301 includes an optical system, an image sensor, and the like. The image capturing unit 301 captures a plurality of lanes (e.g., the periphery of the plurality of gate devices 103) in which the passages are controlled, and generates a captured image. The image capturing unit 301 performs such image capturing under control by the control unit 302.

The control unit 302 performs processing relating to the control of the image capturing unit 301. For example, the control unit 302 controls the image capturing by the image capturing unit 301, on the basis of the control information supplied from the control device 101 via the communication unit 303, that is, on the basis of the control by the control device 101. In addition to the shutter operation of the camera 102, the control unit 302 can control, for example, the focal length, aperture, pan and tilt, and zoom in and zoom out of the camera 102. Further, the control unit 302 acquires the captured image generated by the image capturing unit 301, and supplies the captured image to the control device 101 via the communication unit 303.

The communication unit 303 communicates with the control device 101 to exchange information. For example, the communication unit 303 acquires information (e.g., control information and the like) sent from the control device 101, and supplies the information to the control unit 302. Further, the communication unit 303 sends information (e.g., captured image and the like) supplied from the control unit 302, to the control device 101. Note that the communication method to be performed by the communication unit 303 may be selected freely. Wired communication may be performed, or wireless communication may be performed.

<Gate Device>

Figure 10:
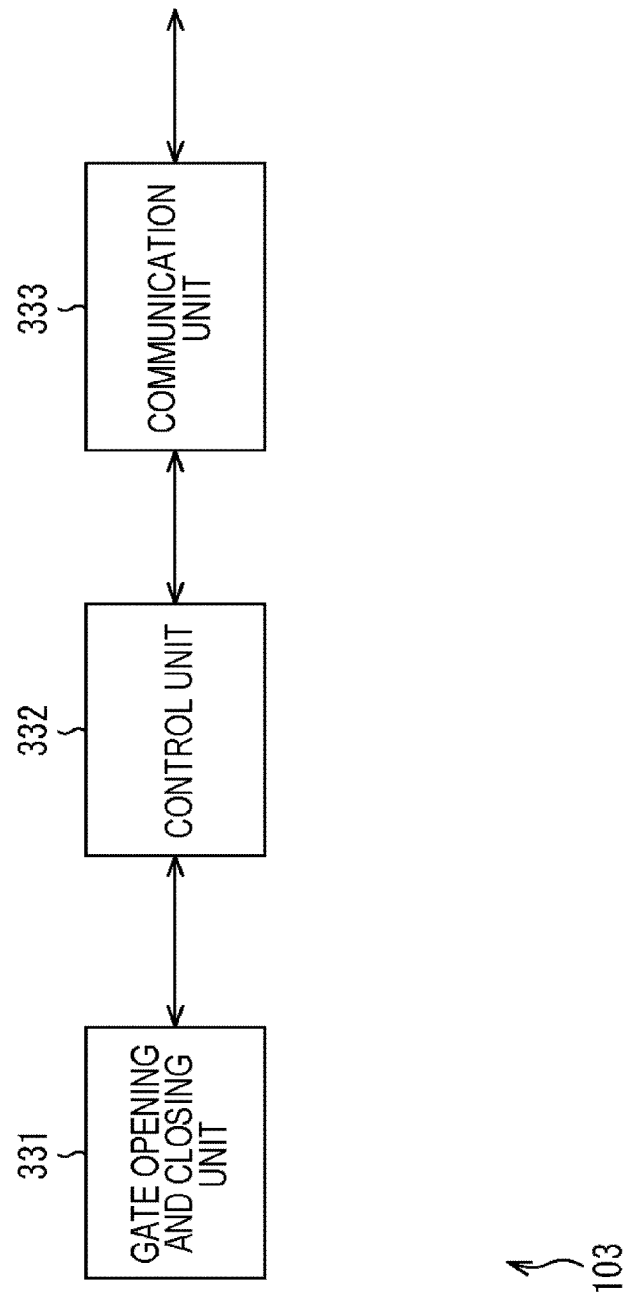
FIG. 10 is a block diagram illustrating a main configuration example of a gate device.

FIG. 10 is a block diagram illustrating a main configuration example of the gate device 103. Note that FIG. 10 mainly illustrates, for example, a processing unit and a data flow, and thus those illustrated in FIG. 10 are not necessarily all that are present. That is, in the gate device 103, a processing unit not illustrated as a block in FIG. 10 may be present, and processing or a data flow not indicated as an arrow or the like in FIG. 10 may be present.

As illustrated in FIG. 10, the gate device 103 includes a gate opening and closing unit 331, a control unit 332, and a communication unit 333. The gate opening and closing unit 331 includes, for example, an actuator and the like, and opens and closes the gate 103A. The gate opening and closing unit 331 opens and closes the gate 103A such as described above, under control by the control unit 332.

The control unit 332 performs processing relating to the control of the gate opening and closing unit 331. For example, the control unit 332 controls the gate opening and closing unit 331 on the basis of the control information supplied from the control device 101 via the communication unit 333, that is, on the basis of the control by the control device 101. Further, the control unit 332 acquires information indicating the open or closed state of the gate 103A from the gate opening and closing unit 331, and supplies the information to the control device 101 via the communication unit 333. The communication unit 333 communicates with the control device 101 to exchange information. For example, the communication unit 333 acquires information (e.g., control information and the like) sent from the control device 101, and supplies the information to the control unit 332. Further, the communication unit 333 sends information (e.g., captured image and the like) supplied from the control unit 332, to the control device 101. Note that the communication method to be performed by the communication unit 333 may be selected freely. Wired communication may be performed, or wireless communication may be performed.

<Independent Control of Each Gate>

Figure 11:
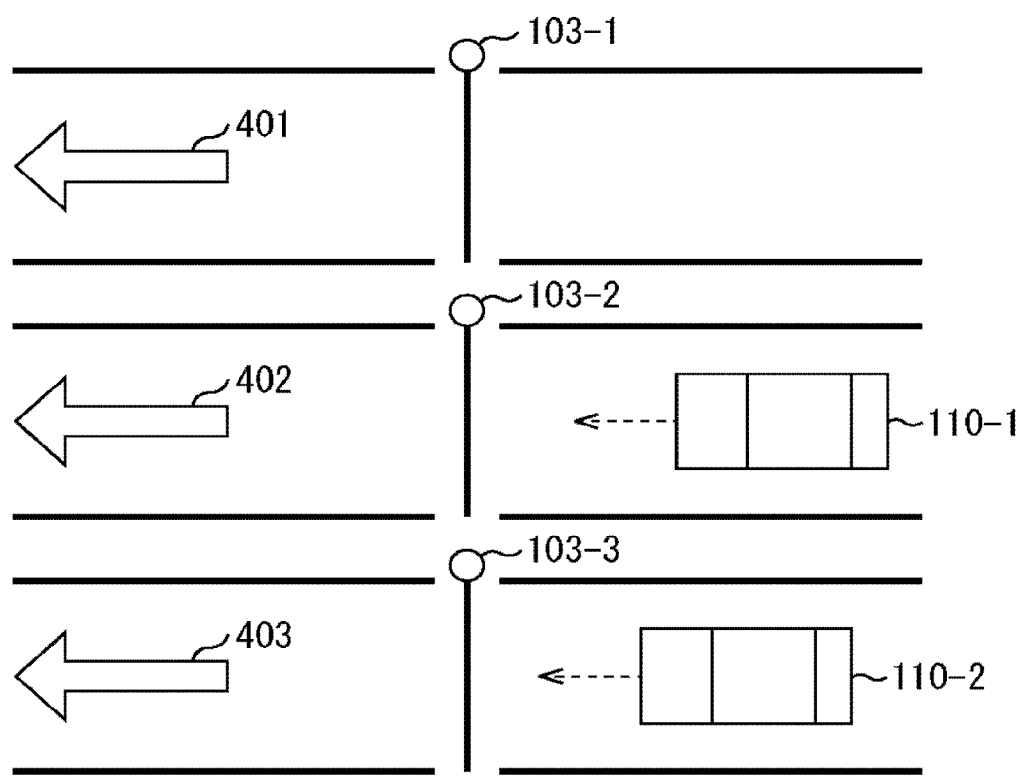
FIG. 11 illustrates an example of passage control.

Next, the flow of passage control processing such as above will be described. First, as illustrated in FIG. 11, there will be described a case where paths ahead of the respective gates of a plurality of lanes are mutually independent. In the case of the example of FIG. 11, the three lanes are also mutually independent ahead of the gate devices 103-1 to 103-3 as indicated by arrows 401 to 403 (the lanes do not join). Therefore, the respective passages of vehicles 110 in the lanes can be controlled mutually independently. That is, the gate devices 103-1 to 103-3 can mutually independently control the opening and closing of the gates. For example, the vehicle 110-1 and the vehicle 110-2 can pass simultaneously.

For example, in a case where it is necessary to pass a large number of vehicles in a short time in a large parking lot provided at, for example, a concert hall or a stadium, such passage control is applicable.

<Flow of Area Setting Processing>

In a case where an LPR area and the like are set to a captured image, the control device 101 executes area setting processing. An example of the flow of the area setting processing will be described with reference to the flowchart of FIG. 12.

After the area setting processing starts, in step S101, the camera control unit 121 controls the camera 102 via the communication unit 126 such that the camera 102 starts image capturing. The camera 102 starts capturing a lane on the periphery of a gate device 103 under the control by the camera control unit 121.

In step S102, the LPR processing unit 123 sets, in the captured image generated by the camera 102, an area corresponding to each lane kept within the angle of view of the camera 102 (i.e., each lane included in the captured image). In the case of the example of FIG. 4, the LPR processing unit 123 sets the region between the one-dot chain line 211 and the one-dot chain line 212 (the region of X1 to X2), the region between the one-dot chain line 213 and the one-dot chain line 214 (the region of X3 to X4), and the region between the one-dot chain line 215 and the one-dot chain line 216 (the region of X5 to X6).

In step S103, the LPR processing unit 123 sets an LPR area in the captured image. In the case of the example of FIG. 4, the LPR processing unit 123 sets the LPR area 221 (Y1 to Y2).

In step S104, the LPR processing unit 123 sets a gate opening line indicating a position for causing the gate 103A of the gate device 103 to open, as a position for performing a predetermined control for a process target. In the case of the example of FIG. 4, the LPR processing unit 123 sets the gate opening line 222 (Y3).

In step S105, the LPR processing unit 123 sets a gate closing line indicating a position for causing the gate 103A of the gate device 103 to close, as a position for performing a predetermined control for the process target. In the case of the example of FIG. 4, the LPR processing unit 123 sets the gate closing line 223 (Y4).

In step S106, the LPR processing unit 123 generates area information that associates the identification information of a lane (lane number) with the coordinate range of a region corresponding to the lane. Note that other pieces of information (e.g., LPR area, gate opening line, gate closing line, and the like) that have been set as described above can be added to the area information. The LPR processing unit 123 registers the generated area information in the area information database 129.

In step S107, the LPR processing unit 123 determines whether or not to update the area information. For example, in a case where the angle of view of the camera 102 (e.g., capturing direction, tilt, zoom ratio, and the like) has changed, the LPR processing unit 123 can determine to update the area information such that the area information corresponds to the change. In a case where it is determined to update the area information, the flow returns to step S102, and processing in step S102 and subsequent steps is repeated.

In step S107, in a case where it is determined not to update the area information, the flow proceeds to step S108.

In step S108, the LPR processing unit 123 determines whether or not to end the area setting processing. In a case where it is determined not to end the area setting processing, the flow returns to step S107, and processing in step S107 and subsequent steps is repeated.

On the other hand, in step S108, in a case where it is determined to end the area setting processing, the area setting processing ends.

The area setting processing as described above can be performed easier compared with a case where area setting is performed manually.

<Flow of LPR Processing>

Figure 13:
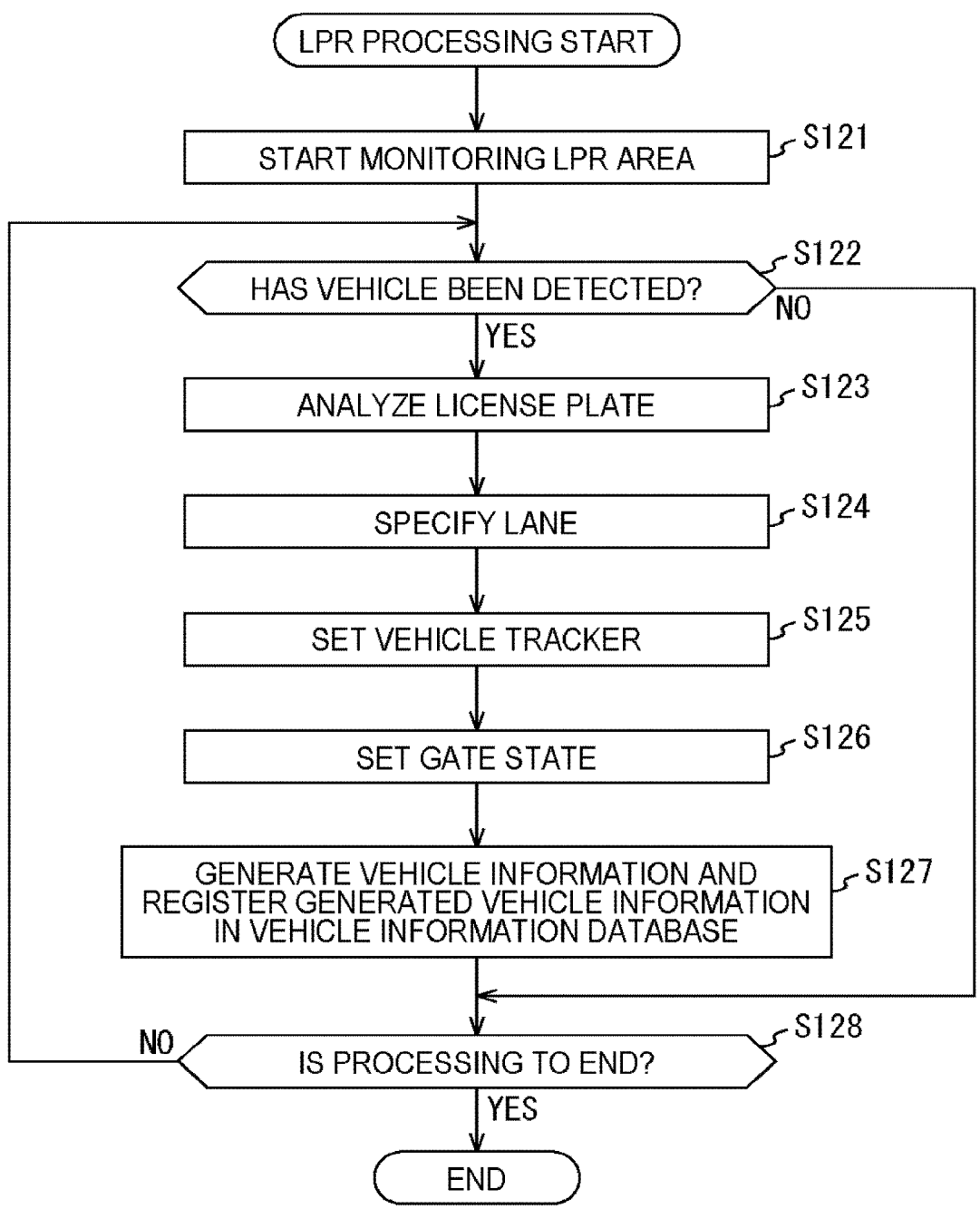
FIG. 13 is a flowchart explanatorily illustrating an example of the flow of license plate recognition (LPR) processing.

Next, an example of the flow of the LPR processing of which a license plate is detected and then vehicle information is registered will be described with reference to the flowchart of FIG. 13.

After the LPR processing starts, in step S121, the LPR processing unit 123 starts monitoring the LPR area in the captured image supplied from the camera 102. That is, the LPR processing unit 123 detects a vehicle in a predetermined partial region in the LPR area.

In step S122, the LPR processing unit 123 determines whether or not the vehicle has been detected in the LPR area on the basis of the monitoring. In a case where it is determined that the vehicle has been detected, the flow proceeds to step S123.

In step S123, the LPR processing unit 123 analyzes the vehicle registration number and the like shown on the license plate that has been detected in the LPR area.

In step S124, the LPR processing unit 123 specifies the lane in which the vehicle is located, on the basis of the position of the detected vehicle (on the basis of the region in which the vehicle is located).

In step S125, the LPR processing unit 123 sets a vehicle tracker to the detected vehicle.

In step S126, the LPR processing unit 123 sets a gate state indicating the state of the gate 103A that is the control target.

In step S127, the LPR processing unit 123 uses various types of information specified and set as above to generate vehicle information (e.g., FIG. 8). The LPR processing unit 123 registers the vehicle information in the vehicle information database 128.

After the processing of step S127 ends, the flow proceeds to step S128. On the other hand, in step S122, in a case where it is determined that no vehicle has not been detected, the flow proceeds to step S129.

In step S129, the LPR processing unit 123 determines whether or not to end the LPR processing. In a case where it is determined not to end the LPR processing, the flow returns to step S122, and processing in step S122 and subsequent steps is repeated.

On the other hand, in step S129, in a case where it is determined to end the LPR processing, the LPR processing ends.

Setting the vehicle information as above enables easier acquisition of the information regarding the control of the gate based on the vehicle, based on the vehicle information. Therefore, the control of the gate based on the vehicle can be performed more easily.

Further, as above, the lane in which the vehicle is located can be more easily specified on the basis of the position of the vehicle in the captured image. Therefore, there can be inhibited an increase in cost in such passage control of a plurality of lanes.

<Flow of Vehicle Tracking Processing>

In addition, in a case of updating the position of the vehicle (position of the vehicle tracker) in the vehicle information, the vehicle tracking processing unit 124 performs vehicle tracking processing. An example of the flow of this vehicle tracking processing will be described with reference to the flowchart of FIG. 14.

After the vehicle tracking processing starts, in step S141, the vehicle tracking processing unit 124 determines whether or not the vehicle information is present in the vehicle information database 128. In a case where it is determined that the vehicle information is present, the flow proceeds to step S142.

In step S142, the vehicle tracking processing unit 124 updates the position of the vehicle tracker in the vehicle information to the current position.

After the processing of step S142 ends, the flow proceeds to step S143. On the other hand, in step S141, in a case where it is determined that no vehicle information is present, the flow proceeds to step S143.

In step S143, the vehicle tracking processing unit 124 determines whether or not to end the vehicle tracking processing. In a case where it is determined not to end the vehicle tracking processing, the flow returns to step S141, and processing in step S141 and subsequent steps is repeated.

On the other hand, in step S143, in a case where it is determined to end the vehicle tracking processing, the vehicle tracking processing ends.

Performing the vehicle tracking processing in such a manner enables easy update of the position of the vehicle tracker in the vehicle information to the latest position.

<Flow of Gate Processing>

Figure 15:
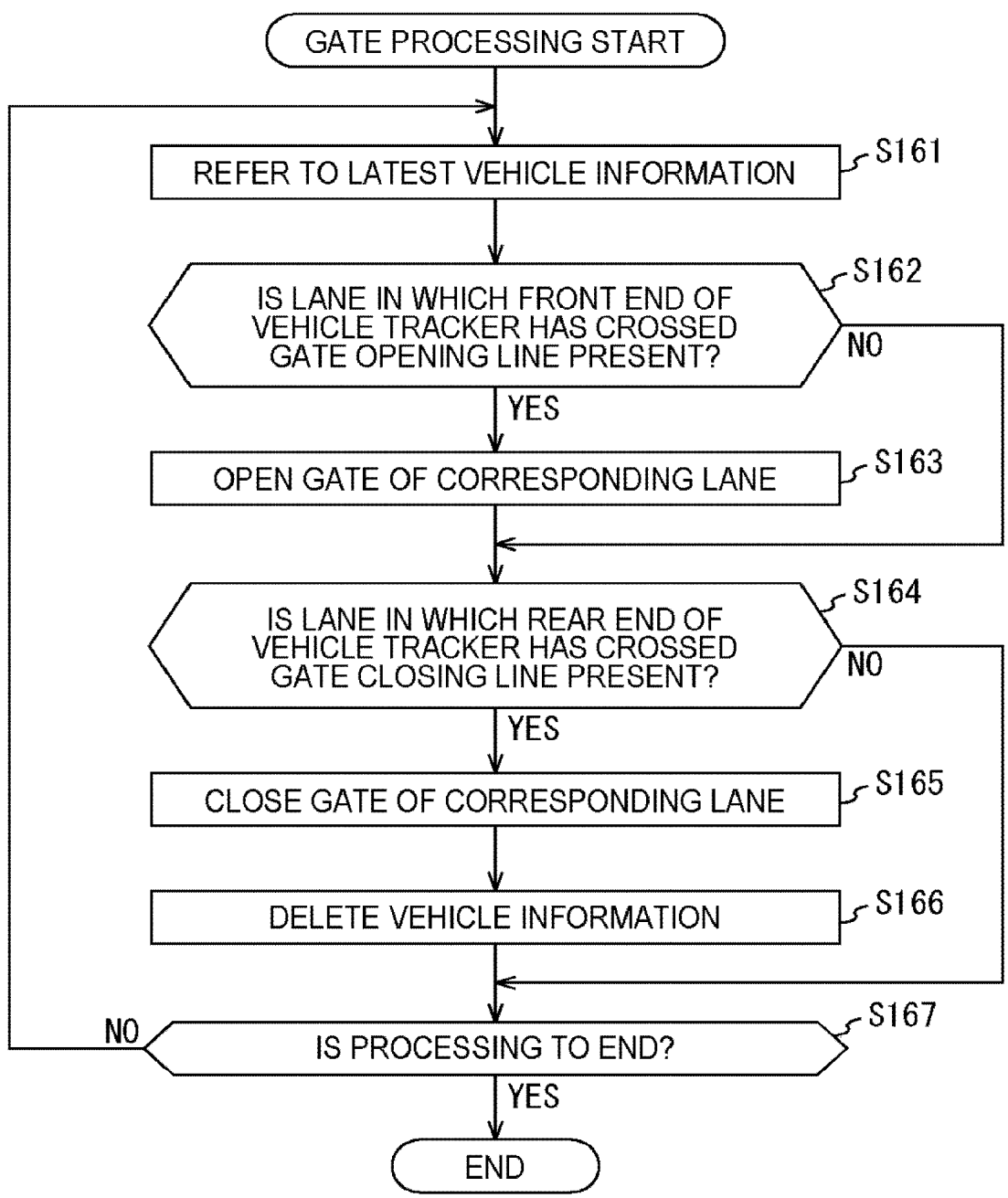
FIG. 15 is a flowchart explanatorily illustrating an example of the flow of gate processing.

In a case of controlling the opening and closing of the gate, the gate processing unit 125 performs gate processing. An example of the flow of the gate processing will be described with reference to the flowchart of FIG. 15.

After the gate processing starts, in step S161, the gate processing unit 125 refers to the latest vehicle information registered in the vehicle information database 128.

In step S162, the gate processing unit 125 determines, on the basis of the referred vehicle information, whether or not a lane in which the front end of the vehicle tracker has crossed the gate opening line is present. In a case where it is determined that the lane is present, the flow proceeds to step S163.

In step S163, the gate processing unit 125 opens the gate of the corresponding lane, that is, the gate of the lane in which the front end of the vehicle tracker has crossed the gate opening line.

After the processing of step S163 ends, the flow proceeds to step S164. On the other hand, in step S162, in a case where it is determined that no lane in which the front end of the vehicle tracker has crossed the gate opening line is present, the flow proceeds to step S164.

In step S164, the gate processing unit 125 determines, on the basis of the referred vehicle information, whether or not a lane in which the rear end of the vehicle tracker has crossed the gate closing line is present. In a case where it is determined that the lane is present, the flow proceeds to step S165.

In step S165, the gate processing unit 125 closes the gate of the corresponding lane, that is, the gate of the lane in which the rear end of the vehicle tracker has crossed the gate closing line.

In step S166, the gate processing unit 125 deletes the vehicle information from the vehicle information database 128.

After the processing of step S166 ends, the flow proceeds to step S167. On the other hand, in step S164, in a case where it is determined that no lane in which the rear end of the vehicle tracker has crossed the gate closing line is present, the flow proceeds to step S167.

In step S167, the gate processing unit 125 determines whether or not to end the gate processing. In a case where it is determined not to end the gate processing, the flow returns to step S161, and processing in step S161 and subsequent steps is repeated.

On the other hand, in step S167, in a case where it is determined to end the gate processing, the gate processing ends.

Performing the gate processing in such a manner enables mutually independent control of the respective gates of the plurality of lanes.

<Control of Linking Plurality of Gates Together>

Figure 16:
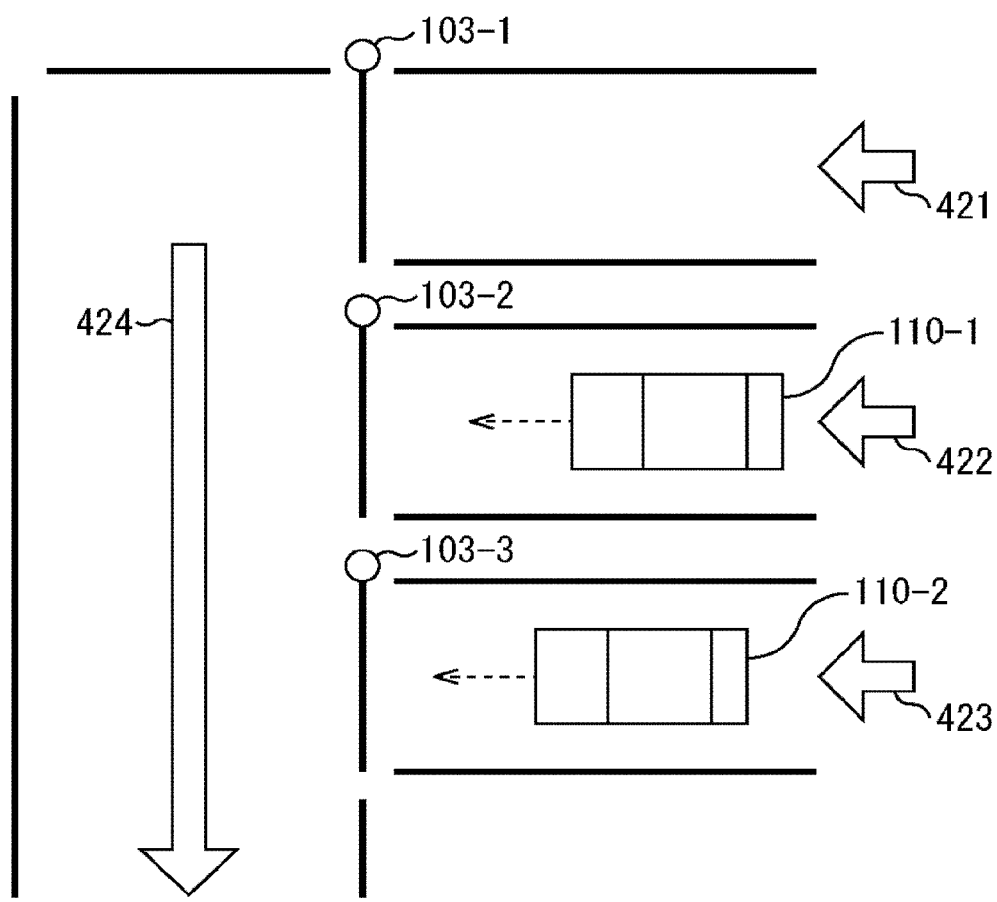
FIG. 16 illustrates an example of passage control.

Note that, as in the example of FIG. 16, a plurality of lanes may join ahead of gates. In the case of the example of FIG. 16, the three lanes that are mutually independent as indicated by arrows 421 to 423 join ahead of the gate devices 103-1 to 103-3 as indicated by an arrow 424. Therefore, it is necessary to pass vehicles 110 on a lane basis such that the vehicles do not collide. That is, in this case, the respective gates of the gate devices 103-1 to 103-3 are controlled so as to be linked together in opening and closing.

<Flow of Gate Processing>

Figure 12:
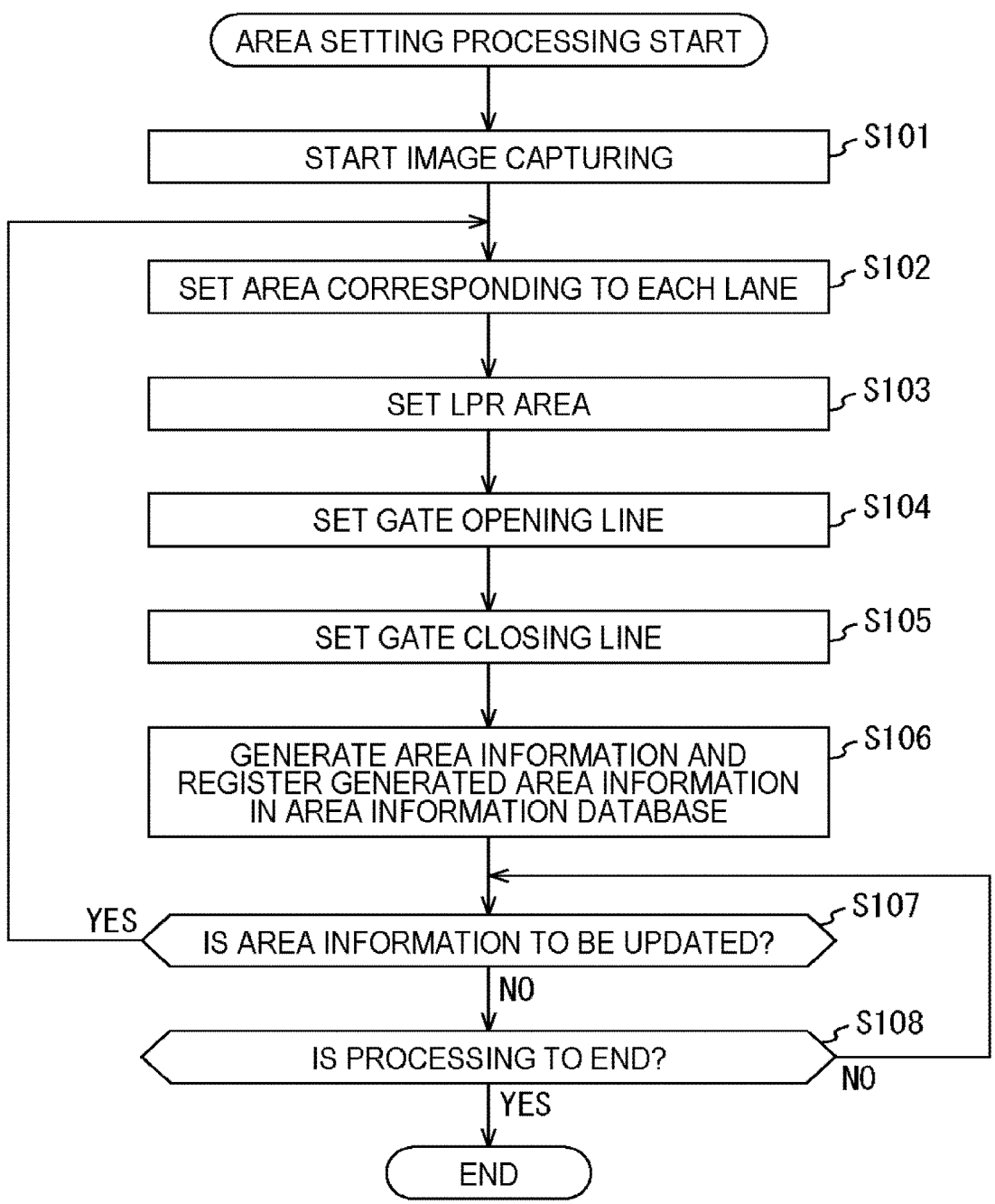
FIG. 12 is a flowchart explanatorily illustrating an example of the flow of area setting processing.
Figure 14:
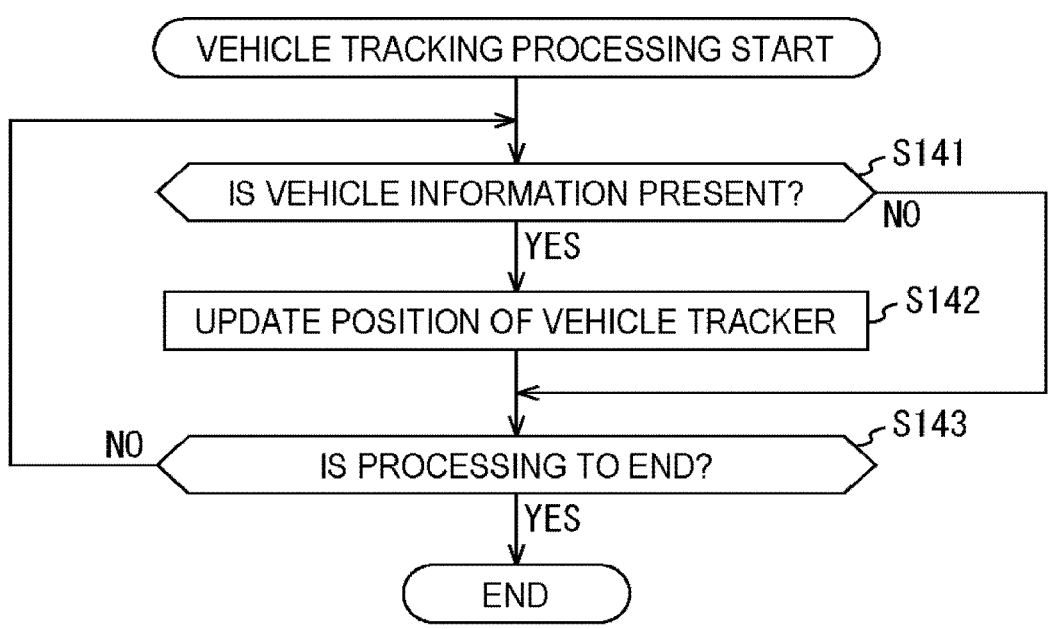
FIG. 14 is a flowchart explanatorily illustrating an example of the flow of vehicle tracking processing.

The area setting processing, the LPR processing, and the vehicle tracking processing each can be performed in a flow similar to the case of <Independent Control of Each Gate> (i.e., the flows described with reference to the flowcharts of FIGS. 12 to 14).

Figure 17:
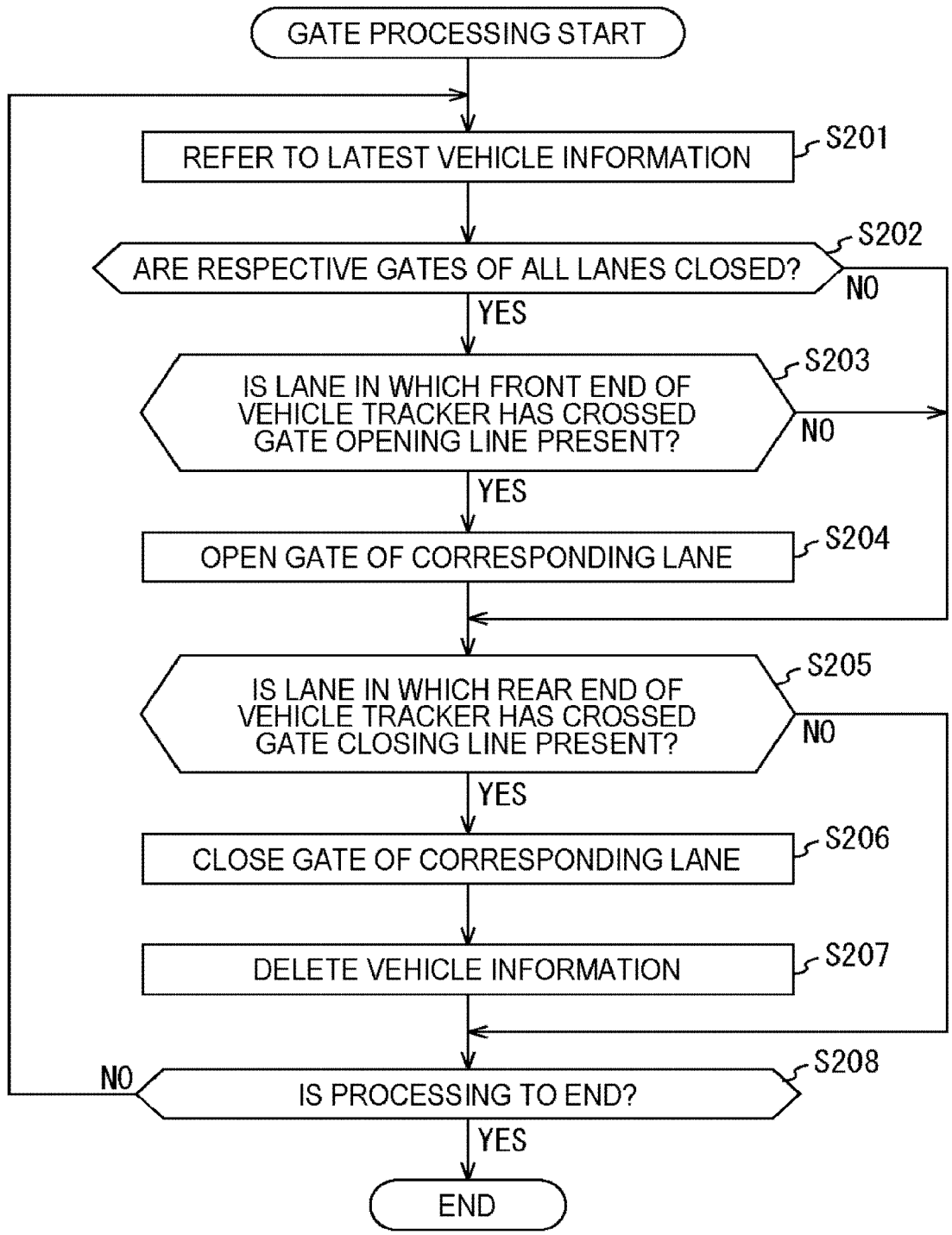
FIG. 17 is a flowchart explanatorily illustrating an example of the flow of gate processing.

An example of the flow of the gate processing in this case will be described with reference to the flowchart of FIG. 17. After the gate processing starts, in step S201, the gate processing unit 125 refers to the latest vehicle information registered in the vehicle information database 128.

In step S202, the gate processing unit 125 determines, on the basis of the referred vehicle information, whether or not the respective gates of all lanes are closed. In a case where it is determined that the gates are closed at all the lanes, the flow proceeds to step S203.

In step S203, the gate processing unit 125 determines, on the basis of the referred vehicle information, whether or not a lane in which the front end of the vehicle tracker has crossed the gate opening line is present. In a case where it is determined that the lane is present, the flow proceeds to step S204.

In step S204, the gate processing unit 125 opens the gate of the corresponding lane, that is, the gate of the lane in which the front end of the vehicle tracker has crossed the gate opening line.

After the processing of step S204 ends, the flow proceeds to step S205. On the other hand, in step S203, in a case where it is determined that no lane in which the front end of the vehicle tracker has crossed the gate opening line is present, the flow proceeds to step S205. In addition, in step S202, in a case where it is determined that a lane at which the gate is open is present, the flow proceeds to step S205.

In step S205, the gate processing unit 125 determines, on the basis of the referred vehicle information, whether or not a lane in which the rear end of the vehicle tracker has crossed the gate closing line. In a case where it is determined that the lane is present, the flow proceeds to step S206.

In step S206, the gate processing unit 125 closes the gate of the corresponding lane, that is, the gate of the lane in which the rear end of the vehicle tracker has crossed the gate closing line.

In step S207, the gate processing unit 125 deletes the vehicle information from the vehicle information database 128.

After the processing of step S207 ends, the flow proceeds to step S208. On the other hand, in step S205, in a case where it is determined that no lane in which the rear end of the vehicle tracker has crossed the gate closing line is present, the flow proceeds to step S208.

In step S208, the gate processing unit 125 determines whether or not to end the gate processing. In a case where it is determined not to end the gate processing, the flow returns to step S201, and processing in step S201 and subsequent steps is repeated.

On the other hand, in step S208, in a case where it is determined to end the gate processing, the gate processing ends.

Performing the gate processing in such a manner enables the control of linking the respective gates of the plurality of lanes, together.

<Camera Position>

In the above description, there has been described that the camera 102 performs image capturing from a location behind the vehicle. However, the position at which the camera 102 is installed may be selected freely, and not limited to the above example. For example, as illustrated in FIG. 18, a camera 102 may be installed ahead of a vehicle so as to perform image capturing from a location ahead of a vehicle. In this case, the camera 102 is installed ahead of a gate device 103 (on the side where the vehicle 110 is located after passing the gate device 103) in the traveling direction of the vehicle 110. Thus, the camera 102 captures the license plate mounted at the front of the vehicle 110. That is, the license plate mounted at the front of the vehicle 110 is detected. Therefore, an LPR area in which the license plate is detected is located near the gate device 103, as indicated by a double-headed arrow 431. That is, the LPR area is set near the position of a gate opening line indicated by an arrow 432. As indicated by an arrow 434, a gate closing line is set closer to the camera 102 than the gate device 103 is.

Note that each camera 102 may be installed ahead of and behind the vehicle 110 in the traveling direction. That is, each camera 102 may be installed at the position illustrated in FIG. 7 and the position illustrated in FIG. 18. In that case, the opening and closing of the gate may be controlled on the basis of two captured images generated by the cameras 102. That is, the lane in which the vehicle 110 is located may be specified on the basis of the detection results of the license plate mounted at the front of the vehicle 110 and the license plate mounted at the rear of the vehicle 110. This arrangement enables more accurate specification of the lane in which vehicle 110 is located. Therefore, the respective gates of the plurality of lanes can be controlled more accurately.

Further, a bump (protrusion) such as illustrated in FIGS. 19A and 19B may be provided in each lane. In FIG. 19A and FIG. 19B, a bump 451 is provided in a lane. For example, as illustrated in FIG. 19A, when a rear wheel of the vehicle 110 rides on the bump 451, the license plate 110A mounted at the rear of the vehicle 110 faces upward. Therefore, the license plate 110A faces upward so as to be close to the camera 102 that performs image capturing from above the vehicle 110. As a result, the license plate can be more accurately recognized from the captured image.

Further, for example, as illustrated in FIG. 19B, when a front wheel of the vehicle 110 rides on the bump 451, the license plate 110B mounted at the front of the vehicle 110 faces upward. Therefore, the license plate 110B faces upward so as to be close to the camera 102 that performs image capturing from above the vehicle 110. As a result, the license plate can be more accurately recognized from the captured image.

<Case of License Plate (LP) Recognition Error>

Figure 20:
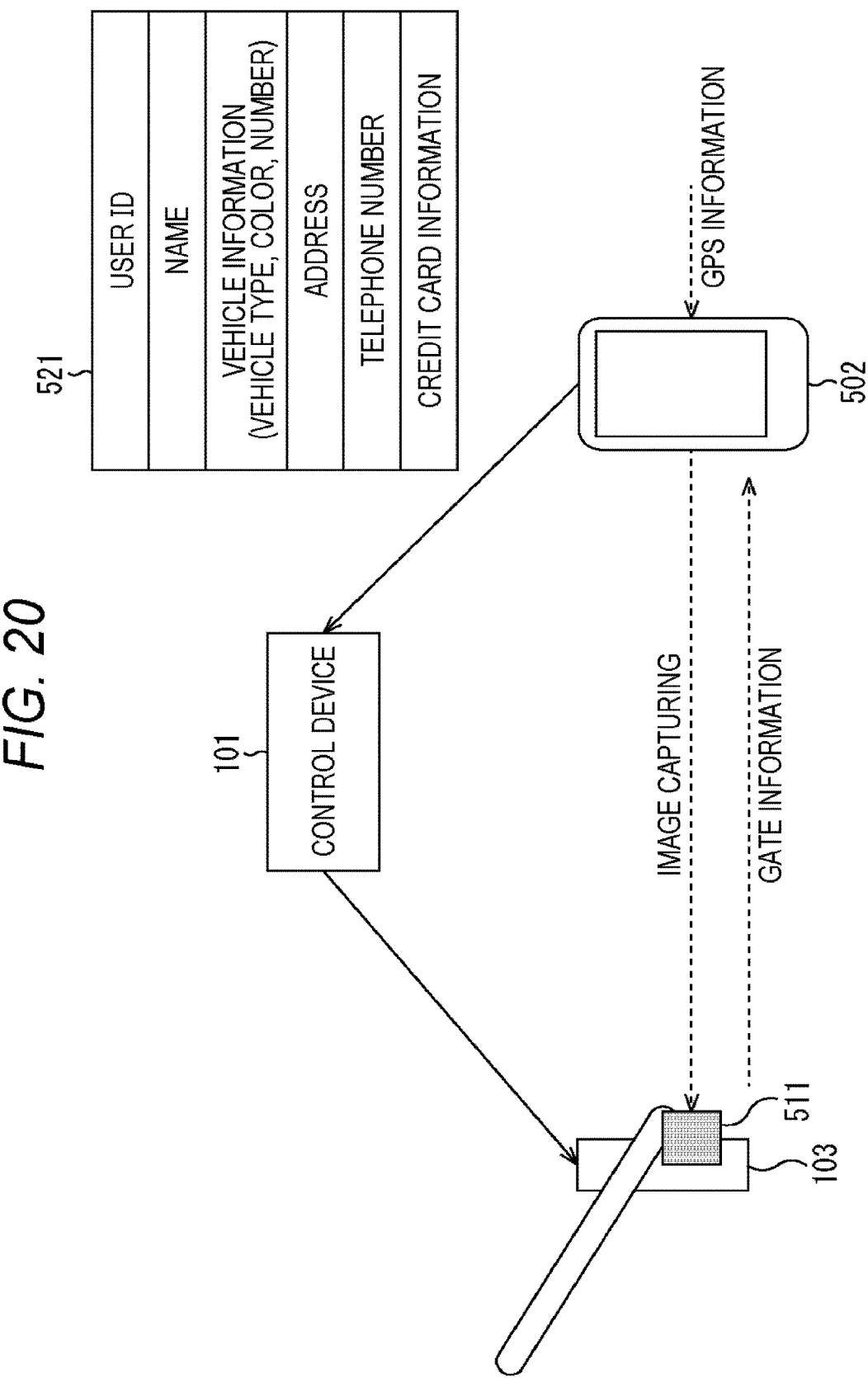
FIG. 20 explanatorily illustrates an example of processing performed when license plate recognition fails.

In a case where recognition of a license plate fails, processing may be performed by a method illustrated in FIG. 20, for example. A parking service provider provides a smartphone application for users to make a reservation in advance. Each user provides user information 521 through the application.

As illustrated in FIG. 20, the user information 521 includes a user ID, a name, vehicle information (e.g., vehicle type, color, number, and the like), an address, a telephone number, credit card information, and the like. The user having a portable information-processing terminal device 502 (e.g., smartphone) provides the user information 521 via, for example, the application running on the portable information-processing terminal device 502.

Then, for example, the user uses a login session subjected to login processing performed when launching the smartphone application, or a login session that has been used recently. For example, pressing the "Manual LP recognition" button puts the smartphone into the camera image-capturing mode. The user captures a QR code attached to the casing of a gate device 103 and presses the send button. Gate information is embedded in the QR code, and the smartphone application acquires the information (QR code) (note that the QR code may be sent as it is and decrypted by a server). The application running on the smartphone typically embeds a date and time and GPS information in EXIF, and it is authenticated that the user is present in this place at this moment. The user sends the user ID, the date and time, the GPS information, the gate information, and the like via the application. The vehicle information that is associated with the user ID and managed by the server is used to perform processing similar to processing in successful LP recognition.

<Application Example of Vehicle Passage Control System>

The vehicle passage control system 100 such as above is, for example, applicable to any place where passage is controlled, such as a parking lot (e.g., entrance or exit, or entrance or exit of a region separated from other regions in the parking lot (e.g., resident dedicated parking lot)), or a toll booth provided at a toll road. Note that in the above description, the gate device 103 is used as the control target; however, any device is applicable as a control target. For example, as a control target, there is applicable a guidance display device (e.g., guidance light, or display for information display) for guiding the passage of a vehicle. Further, a traffic signal may be applicable as a control target. Needless to say, other devices may be applicable.

2. Supplementary Note

<Computer>

The series of processing described above can be performed with hardware or software. In a case where the series of processing is performed with software, a program included in the software is installed on a computer. Here, examples of the computer include a computer embedded in dedicated hardware, and, for example, a general-purpose personal computer on which various types of programs are installed so as to be executable of various types of functions.

FIG. 21 is a block diagram of an exemplary hardware configuration of a computer that uses a program to execute the series of processing described above.

In a computer 900 illustrated in FIG. 21, a central processing unit (CPU) 901, a read only memory (ROM) 902, and a random access memory (RAM) 903 are mutually connected via a bus 904.

In addition, an input-output interface 910 is connected to the bus 904. An input unit 911, an output unit 912, a storage unit 913, a communication unit 914, and a drive 915 are connected to the input-output interface 910. The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable recording medium 921 such as a magnetic disk, an optical disk, a magneto-optical disk, or a semiconductor memory.

In the computer having the configuration as above, the CPU 901 loads, for example, a program stored in the storage unit 913, into the RAM 903 via the input-output interface 910 and the bus 904 to execute the program, so that the series of processing described above is performed. In addition, data necessary for execution of various types of processing by the CPU 901 is stored appropriately in the RAM 903, for example.

The program to be executed by the computer is applicable by being recorded on, for example, the removable recording medium 921 as a package medium or the like. In that case, attachment of the removable recording medium 921 to the drive 915 enables installation of the program in the storage unit 913 via the input-output interface 910.

Further, the program can also be provided via a wired or wireless transmission medium such as a local area network, the Internet, or digital satellite broadcasting. In that case, the program can be received by the communication unit 914 and installed in the storage unit 913.

Besides, the program can be preinstalled in the ROM 902 or the storage unit 913.

<Applicable Target of Present Technology>

Note that a system, a device, a processing unit, and the like to which the present technology is applied can be used in any field such as transportation, medical care, crime prevention, agriculture, livestock industry, mining, beauty, factory, home appliance, weather, and nature monitoring. Further, the use may be selected freely. For example, the present technology is applicable to a system and a device to be provided for use in providing a content for appreciation and the like. In addition, for example, the present technology is applicable to a system and a device to be provided for use in transportation, such as monitoring and managing a transportation situation, and autonomous driving control. Further, for example, the present technology is applicable to a system and a device to be provided for use in security. Furthermore, for example, the present technology is applicable to a system and a device to be provided for use in automatic control of a machine or the like. Still furthermore, for example, the present technology is applicable to a system and a device to be provided for use in agriculture and livestock industry. Still furthermore, for example, the present technology is applicable to a system and a device that monitors a natural state such as a volcano, a forest, and the ocean, or monitors wildlife and the like. Still furthermore, for example, the present technology is applicable to a system and a device to be provided for use in sports.

OTHERS

Embodiments of the present technology are not limited to the above embodiments, and various modifications can be made without departing from the gist of the present technology.

For example, the present technology is achievable as any constituent of an apparatus or a system, such as a processor as a system large scale integration (LSI), a module including a plurality of processors and the like, a unit including a plurality of modules and the like, or a set including a unit to which other functions are further added (i.e., partial constituent of an apparatus). Further, each processing unit described above is achievable by any constituent. For example, each processing unit may include a circuit, an LSI, a system LSI, a processor, a module, a unit, a set, a device, an apparatus, a system, or the like. Further, each processing unit may be provided with a combination of a plurality of those described above. In the combination, constituents that are the same in type, such as a plurality of circuits or a plurality of processors, may be combined, or constituents that are different in type, such as a circuit and an LSI, may be combined, for example.

Note that, in the present specification, a system means a collection of a plurality of constituent elements (e.g., apparatus and modules (parts)), regardless of whether or not all the constituent elements are included in the same casing. Therefore, a plurality of devices accommodated in separate casings and connected via a network, and one device having a plurality of modules accommodated in one casing are both systems.

In addition, for example, the configuration described as one device (or one processing unit) may be divided to provide as a plurality of devices (or a plurality of processing units). Conversely, the configuration described above as a plurality of devices (or a plurality of processing units) may be collectively provided as one device (or one processing unit). Further, a configuration different from those described above may be added to the configuration of each device (or each processing unit). Furthermore, if the configuration and operation as the entire system are substantially the same, part of the configuration of a certain device (or a certain processing unit) may be included in the configuration of another device (or another processing unit).

In addition, for example, the present technology can take a cloud computing configuration in which one function is processed by sharing and collaborating among a plurality of devices via a network. For example, the present technology is also applicable to a cloud service that provides services relating to captured images (moving images), to any terminal such as a computer, an audio visual (AV) device, a portable information-processing terminal, and an internet of things (IoT) device.

In addition, for example, the above program can be executed by any device. In that case, it is sufficient if the device has a necessary function (e.g., function block) so as to be acquirable of necessary information. In addition, for example, each step described in the above flowcharts can be not only performed by one device, but also can be performed by sharing among a plurality of devices. Further, in a case where a plurality of pieces of processing is included in one step, the plurality of pieces of processing included in the one step can be not only performed by one device, but also can be performed by sharing among a plurality of devices. In other words, a plurality of pieces of processing included in one step can be performed as a plurality of steps. Conversely, each processing described as a plurality of steps can be collectively performed as one step.

The program to be executed by the computer may be provided such that the processing of the steps described in the program is performed chronologically in accordance with the order described in the present specification. Alternatively, the program may be provided such that the processing of the steps described in the program is performed in parallel, or separately at necessary timing, for example, when a call is made. That is, as long as no inconsistency arises, the program may be provided such that the processing of each step is performed in an order different from the order described above. Further, the processing of the steps described in the program may be performed in parallel with the processing of another program, or may be performed in combination with the processing of the other program.

The plurality of aspects of the present technology described in the present specification can be carried out solely and independently, as long as no inconsistency arises. Needless to say, any aspects of the plurality of aspects of the present technology may be used together and carried out. For example, part or all of the present technology described in any of the embodiments may be combined with part or all of the present technology described in another embodiment. In addition, part or all of any of the plurality of aspects of the present technology described above may be carried out in combination with another technology that is not described above.

The present technology can also take the following configurations.

(1) An information processing apparatus including: a specifying unit configured to specify, on the basis of a position of an object in a captured image, from a plurality of control targets, the control target to be controlled in accordance with the object.

(2) The information processing apparatus according to (1), in which regions mutually different are set one-to-one to the control targets in the captured image, and the specifying unit specifies the control target to be controlled in accordance with the object, depending on which of the regions the object is located in.

(3) The information processing apparatus according to (2), further including:

an object information storage unit configured to store object information that associates identification information of the object with the control target specified by the specifying unit.

(4) The information processing apparatus according to (3), in which the specifying unit detects the object in a predetermined partial region in the region and specifies the control target to be controlled in accordance with the object that has been detected.

(5) The information processing apparatus according to (4), in which the object is a vehicle.

(6) The information processing apparatus according to (5), in which the specifying unit:

detects a license plate of the vehicle in the partial region;

analyzes registration information of the vehicle shown on the license plate;

detects a vehicle position that is a position of the vehicle in the captured image, on the basis of a position of the license plate that has been detected;

specifies the control target to be controlled in accordance with the object, on the basis of the vehicle position that has been detected;

generates, with the registration information that has been analyzed, as the identification information of the vehicle, the object information that associates the registration information, the vehicle position that has been detected, and the control target that has been specified; and causes the object information storage unit to store the object information that has been generated.

(7) The information processing apparatus according to (6), further including:

an updating unit configured to detect the vehicle position every predetermined time, to update the vehicle position in the object information stored in the object information storage unit.

(8) The information processing apparatus according to (7), further including:

a control unit configured to control the control target specified by the specifying unit, on the basis of the vehicle position in the object information.

(9) The information processing apparatus according to (8), in which the control target is a gate, and the control unit controls opening and closing of the gate on the basis of the vehicle position.

(10) The information processing apparatus according to (9), in which in a case where the vehicle is located at a predetermined place, the control unit causes the gate in a closed state to open, the gate corresponding to the vehicle.

(11) The information processing apparatus according to (9), in which in a case where the vehicle is located at a predetermined place and any gate different from the gate corresponding to the vehicle is in a closed state, the control unit causes the gate corresponding to the vehicle to open.

(12) The information processing apparatus according to any of (9) to (11), in which in a case where the vehicle is located at a predetermined place, the control unit causes the gate in an open state to close, the gate corresponding to the vehicle.

(13) The information processing apparatus according to (12), in which the control unit further causes the object information storage unit to delete the object information of the vehicle corresponding to the gate.

(14) The information processing apparatus according to any of (1) to (13), further including:

an image capturing unit configured to capture periphery of the plurality of control targets, to generate the captured image.

(15) The information processing apparatus according to (14), in which the image capturing unit performs image capturing from at least one of a location ahead of or a location behind the object in a traveling direction of the object located on the periphery of the plurality of control targets.

(16) The information processing apparatus according to (15), further including:

a region information storage unit configured to store region information indicating regions that are mutually different and are set one-to-one to the control targets in the captured image, in which the specifying unit:

sets the regions mutually different, one-to-one to the control targets in the captured image generated by the image capturing unit;

causes the region information storage unit to store the region information indicating the regions that are set; and specifies the control target to be controlled in accordance with the object, depending on which of the regions the object is located in, the regions being indicated by the region information stored in the region information storage unit.

(17) The information processing apparatus according to any of (1) to (16), further including:

a display unit configured to display the captured image.

(18) The information processing apparatus according to (17), further including:

an image generation unit configured to generate a superimposition image that is to be superimposed on the captured image for display on the display unit, in which the display unit displays a composite image including the superimposition image superimposed on the captured image.

(19) An information processing method, including: specifying, on the basis of a position of an object in a captured image, from a plurality of control targets, the control target to be controlled in accordance with the object.

(20) A program for causing a computer to function as: a specifying unit that specifies, on the basis of a position of an object in a captured image, from a plurality of control targets, the control target to be controlled in accordance with the object.

REFERENCE SIGNS LIST 21 to 23 Gate
31 Vehicle
31A License plate
32 Vehicle
32A License plate
33 Vehicle
33A License plate
51 Camera
100 Vehicle passage control system
101 Control device
102 Camera
103 Gate device
103A Gate
110 Vehicle
110A License plate
121 Camera control unit
122 UI processing unit
123 LPR processing unit
124 Vehicle tracking processing unit
125 Gate processing unit
126 Communication unit
127 Display unit
128 Vehicle information database
129 Area information database
201 Captured image
221 LPR area
222 Gate opening line
223 Gate closing line
231 Vehicle tracker
301 Image capturing unit
302 Control unit
303 Communication unit
331 Gate opening and closing unit
332 Control unit
333 Communication unit
451 Bump
502 Portable information-processing terminal device
511 QR code
521 User information

The invention claimed is:

1. An information processing apparatus, comprising:
processing circuitry configured to
receive a single captured image,
determine a position of an object detected in the single captured image, and
determine, based on the determined position of the detected object, which one particular control target, of a plurality of control targets in the single captured image, is to be controlled,
wherein a plurality of regions mutually different from one another are set one-to-one to the plurality of control targets in the single captured image, and
the processing circuitry is further configured to determine the one particular control target to be controlled, depending on which of the plurality of regions the detected object is located in within the single captured image.

2. The information processing apparatus according to claim 1, further comprising:
an object information memory to store object information that associates identification information of the object with one of the control targets.

3. The information processing apparatus according to claim 2,
wherein the processing circuitry is further configured to detect the object in a predetermined partial region in the region and determine the one particular control target to be controlled in accordance with the detected object.

4. The information processing apparatus according to claim 3, wherein the object is a vehicle.

5. The information processing apparatus according to claim 4, wherein the processing circuitry is further configured to:
detect a license plate of the vehicle in the partial region;
analyze registration information of the vehicle shown on the license plate;
detect a vehicle position that is a position of the vehicle in the captured image, based on a position of the license plate that has been detected;
determine the one particular control target to be controlled in accordance with the object, based on the detected vehicle position;
generate, with the analyzed registration information, as the identification information of the vehicle, the object information that associates the registration information, the detected vehicle position, and the determined control target; and
cause the object information memory to store the generated object information.

6. The information processing apparatus according to claim 5, wherein the processing circuitry is further configured to:
detect the vehicle position every predetermined time, to update the vehicle position in the object information stored in the object information memory.

7. The information processing apparatus according to claim 6, wherein the processing circuitry is further configured to:
control the determined one particular control target, based on the vehicle position in the object information.

8. The information processing apparatus according to claim 7,
wherein the determined control target is a gate, and
the processing circuitry is further configured to control opening and closing of the gate based on the vehicle position.

9. The information processing apparatus according to claim 8,
wherein when the vehicle is determined to be located at a predetermined place, the processing circuitry is further configured to cause the gate in a closed state to open, the gate corresponding to the vehicle.

10. The information processing apparatus according to claim 8,
wherein when the vehicle is determined to be located at a predetermined place and any gate different from the gate corresponding to the vehicle is in a closed state, the processing circuitry is further configured to cause the gate corresponding to the vehicle to open.

11. The information processing apparatus according to claim 8,
wherein when the vehicle is determined to be located at a predetermined place, the processing circuitry is further configured to cause the gate in an open state to close, the gate corresponding to the vehicle.

12. The information processing apparatus according to claim 11,
wherein the processing circuitry is further configured to cause the object information memory to delete the object information of the vehicle corresponding to the gate.

13. The information processing apparatus according to claim 1, further comprising:
an image capturing unit including an image sensor configured to capture, in the single captured image, a periphery of the plurality of control targets.

14. The information processing apparatus according to claim 13,
wherein the image capturing unit is further configured to perform image capturing from at least one of a location ahead of or a location behind the object in a traveling direction of the object, which is located on the periphery of the plurality of control targets.

15. The information processing apparatus according to claim 14, further comprising:
a region information memory to store region information indicating the plurality of regions that are mutually different from one another and are set one-to-one to the plurality of control targets in the single captured image,
wherein the processing circuitry is further configured to:
set the plurality of regions mutually different, one-to-one to the plurality of control targets in the single captured image;
cause the region information memory to store the region information indicating the regions that are set; and
determine the one particular control target to be controlled, depending on which of the plurality of regions the object is located in, the plurality of regions being indicated by the region information stored in the region information memory.

16. The information processing apparatus according to claim 1, further comprising:
a display unit to display the captured image.

17. The information processing apparatus according to claim 16, wherein the processing circuitry is further configured to:
generate a superimposition image that is to be superimposed on the captured image for display on the display,
wherein the display displays a composite image including the superimposition image superimposed on the captured image.

18. An information processing method, comprising:
receiving a single captured image;
determining a position of an object detected in the single captured image; and
determining, based on the determined position of the detected object, which one particular control target, of a plurality of control targets in the single captured image, is to be controlled,
wherein a plurality of regions mutually different from one another are set one-to-one to the plurality of control targets in the single captured image, and
the method further comprises determining the one particular control target to be controlled, depending on which of the plurality of regions the detected object is located in within the single captured image.

19. A non-transitory computer-readable medium storing a program that, when executed by processing circuitry, causes the processing circuitry to perform a method, comprising:
receiving a single captured image;

determining a position of an object detected in the single captured image; and determining, based on the determined position of the detected object, which one particular control target, of a plurality of control targets in the single captured image, is to be controlled, wherein a plurality of regions mutually different from one another are set one-to-one to the plurality of control targets in the single captured image, and the method further comprises determining the one particular control target to be controlled, depending on which of the plurality of regions the detected object is located in within the single captured image.

* * * * *